United States Patent
Onimatsu et al.

(10) Patent No.: US 11,104,092 B2
(45) Date of Patent: Aug. 31, 2021

(54) PRESSURE ROLLER FOR SHAPING TIRE MEMBER

(71) Applicant: SUMITOMO RUBBER INDUSTRIES, LTD., Kobe (JP)

(72) Inventors: Hiroyuki Onimatsu, Kobe (JP); Kimitaka Yoshimura, Kobe (JP); Santa Momii, Kobe (JP); Takeshi Kawazu, Kobe (JP); Takaji Arai, Kobe (JP); Noboru Ishihara, Kobe (JP); Yu Nosaka, Kobe (JP); Toshiyuki Yamagiwa, Kobe (JP)

(73) Assignee: SUMITOMO RUBBER INDUSTRIES, LTD., Kobe (JP)

(*) Notice: Subject to any disclaimer, the term of this patent is extended or adjusted under 35 U.S.C. 154(b) by 126 days.

(21) Appl. No.: 16/300,230

(22) PCT Filed: Apr. 17, 2017

(86) PCT No.: PCT/JP2017/015449
§ 371 (c)(1),
(2) Date: Nov. 9, 2018

(87) PCT Pub. No.: WO2017/195533
PCT Pub. Date: Nov. 16, 2017

(65) Prior Publication Data
US 2019/0143622 A1 May 16, 2019

(30) Foreign Application Priority Data

| May 10, 2016 | (JP) | JP2016-094809 |
| Aug. 22, 2016 | (JP) | JP2016-161952 |
| Aug. 22, 2016 | (JP) | JP2016-161953 |

(51) Int. Cl.
*B29D 30/28* (2006.01)
*B29D 30/14* (2006.01)

(52) U.S. Cl.
CPC ............ *B29D 30/28* (2013.01); *B29D 30/14* (2013.01)

(58) Field of Classification Search
CPC .... B29D 30/0061; B29D 30/08; B29D 30/14; B29D 30/16; B29D 30/26; B29D 30/28;
(Continued)

(56) References Cited

U.S. PATENT DOCUMENTS 5,257,965 A * 11/1993 Fuchs ...................... D21F 3/08
492/40
2006/0254695 A1* 11/2006 Higuchi ................. B29D 30/28
156/133
(Continued)

FOREIGN PATENT DOCUMENTS

| EP | 2286986 A1 | 2/2011 |
| JP | 59-83833 U | 6/1984 |

(Continued)

OTHER PUBLICATIONS

Masaru Kasugai, JP-2015131428-A, machine translation. (Year: 2015).*
(Continued)

*Primary Examiner* — Robert C Dye
*Assistant Examiner* — Sedef E Paquette
(74) *Attorney, Agent, or Firm* — Birch, Stewart, Kolasch & Birch, LLP

(57) ABSTRACT

To improve durability by preventing breakage of each roller piece for a long time.
It is a pressure roller for pressing a surface of a tire member made from an unvulcanized rubber member. The pressure roller has a support shaft and a plurality of elastically deformable roller pieces supported by the support shaft and arranged in the axial direction of the support shaft. Each roller piece has a pressing surface for contacting with the
(Continued)

surface of the tire member. Each roller piece is independently rotatably supported by the support shaft.

19 Claims, 16 Drawing Sheets

(58) Field of Classification Search
CPC .............................. B29D 30/30; B29D 30/58; B29D 2030/3257; B29C 65/62; B29C 66/81461; B29C 66/83411
USPC ................................ 156/397, 416, 421, 412
See application file for complete search history.

(56) References Cited

U.S. PATENT DOCUMENTS

| | | | | |
|---|---|---|---|---|
| 2008/0000576 | A1* | 1/2008 | Miller | B29C 70/382 156/166 |
| 2008/0011409 | A1* | 1/2008 | Ogawa | B29D 30/14 156/117 |
| 2011/0024053 | A1 | 2/2011 | Byerley | |
| 2017/0087785 | A1* | 3/2017 | Iyanagi | B29D 30/14 |

FOREIGN PATENT DOCUMENTS

| | | |
|---|---|---|
| JP | 4-86248 A | 3/1992 |
| JP | 2008-155418 A | 7/2008 |
| JP | 2011-37113 A | 2/2011 |
| JP | 2012-16869 A | 1/2012 |
| JP | 2013-111864 A | 1/2012 |
| JP | 2015-131428 A | 7/2015 |

OTHER PUBLICATIONS

Extended European Search Report dated Nov. 20, 2019, for European Application No. 17795894.9.
International Search Report, issued in PCT/JP2017/015449, PCT/ISA/210, dated May 16, 2017.

* cited by examiner

FIG.7
(a)
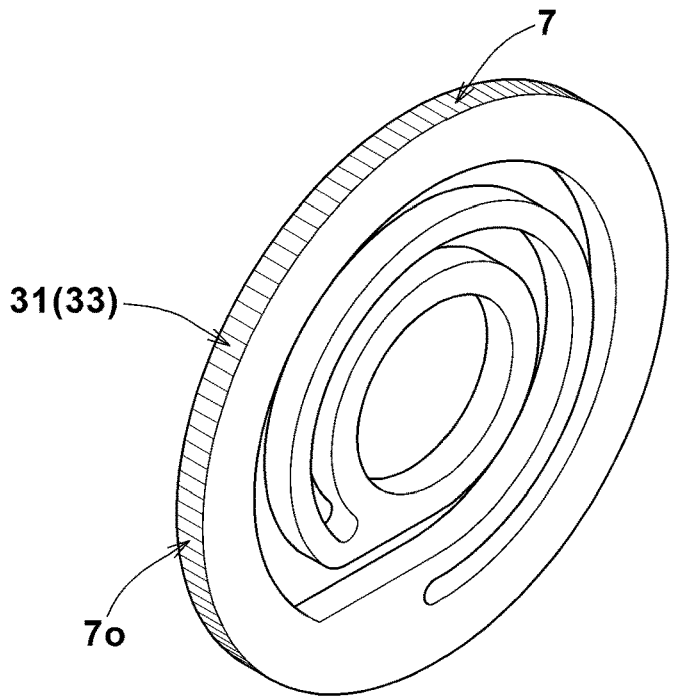
(b)
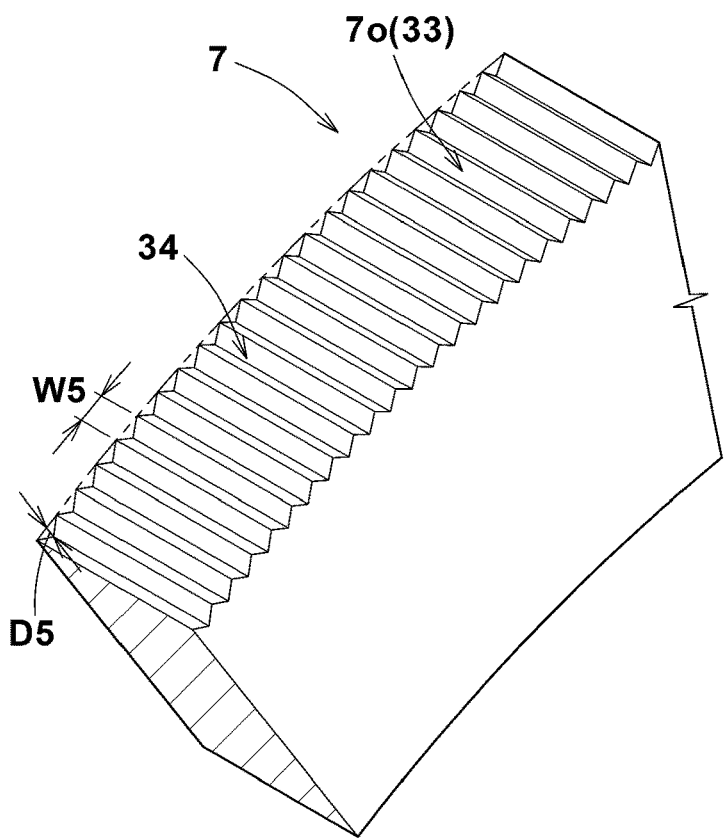

FIG.10
(a)
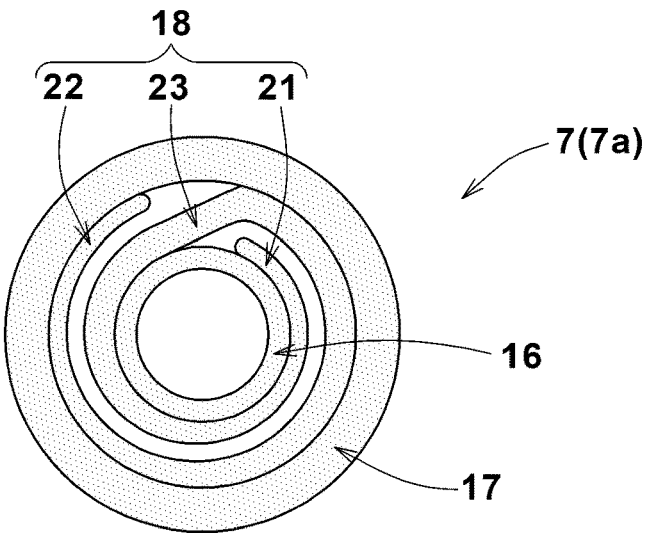
(b)
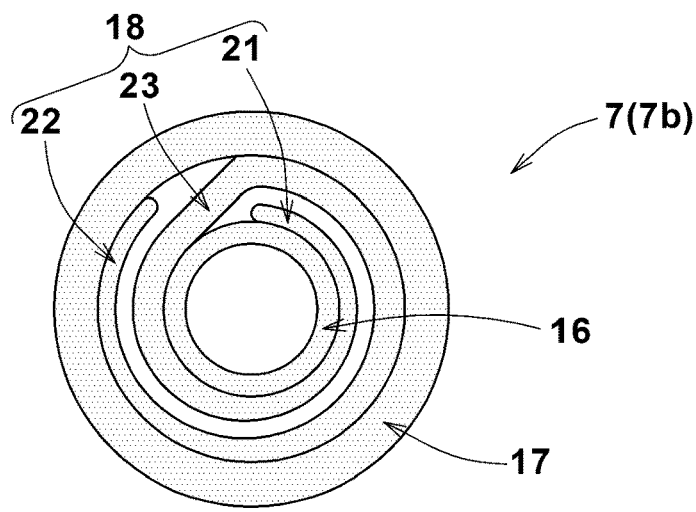
(c)
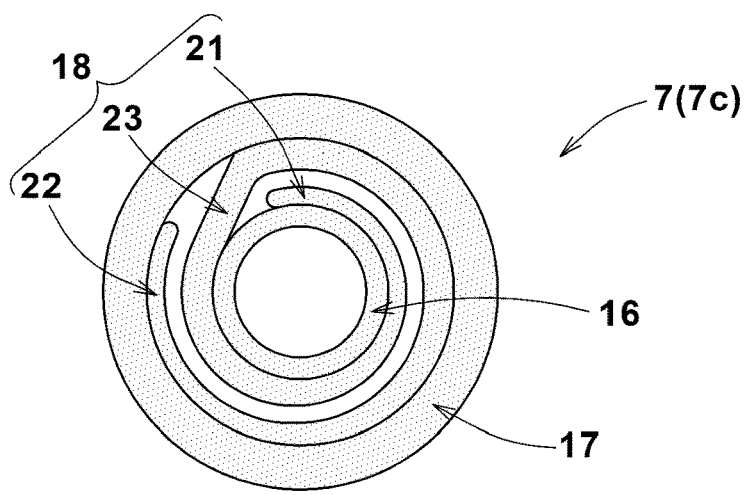

PRESSURE ROLLER FOR SHAPING TIRE MEMBER

TECHNICAL FIELD

The present invention relates to a pressure roller for shaping a tire member, more particularly to a pressure roller having a plurality of roller pieces arranged in the axial direction.

BACKGROUND ART

Recently, a strip winding construction method for manufacturing a tire member by winding an unvulcanized ribbon-like rubber strip has been known.
In the tire members made by this construction method, there is a possibility that air is trapped in each overlapping portion of the strip. Further, there is a possibility that the surface of the tire member becomes somewhat uneven due to the edges of the strip.
Conventionally, in order to discharge the air from these tire members to firmly adhere the rubber strips to each other, the following Patent Document 1 has proposed to press the tire member with a pressure roller.
Patent Document 1: Patent Application Publication No. 2015-131428

DISCLOSURE OF THE INVENTION

Problems to be Resolved by the Invention

However, in the case of a tire member whose surface has unevenness, when the roller pieces are rotated in a state where they are displaced vertically along the shape of the surface, there is a possibility that the roller pieces are largely twisted. And there is a problem that, due to such twist, some of the roller pieces are broken early.
The present invention was made in view of the above problems, and it is a primary object to provide a pressure roller for shaping a tire member which is provided with excellent durability by preventing the breakage of the respective roller pieces for long periods.

Means for Solving the Problems

The present invention is a pressure roller for pressing a surface of a tire member made from an unvulcanized rubber member, which has
a support shaft, and a plurality of elastically deformable roller pieces supported by the support shaft and arranged in the axial direction of the support shaft, each roller piece having a pressing surface for contacting the surface of the tire member, characterized in that
each roller piece is independently rotatably supported by the support shaft.
In the pressure roller for shaping a tire member according to the present invention, the roller pieces may be supported by the support shaft through mutually independent bearings, respectively.
In the pressure roller for shaping a tire member according to the present invention, at least one of the roller pieces may be provided on the outer peripheral surface thereof with an uneven portion for preventing the tire member from adhering.
In the pressure roller for shaping a tire member according to the present invention, the uneven portion may include a portion having a ten-point average roughness (Rz) of 1.3 to 2.5 micrometers.

In the pressure roller for shaping a tire member according to the present invention, the uneven portion may include a knurled portion.
In the pressure roller for shaping a tire member according to the present invention, the knurled portion may have grooves spaced in the circumferential direction of the roller piece, and have a grooves width of 0.5 to 2.0 mm and a depth of 0.5 to 2.0 mm.
In the pressure roller for shaping a tire member according to the present invention, the knurled portion may have grooves spaced in the circumferential direction of the roller piece, and inclined with respect to the axial direction of the roller pieces.
In the pressure roller for shaping a tire member according to the present invention, each roller pieces may comprise an inner ring portion on the support shaft side, an outer ring portion on the side in contact with the tire member, and a spiral-shaped connecting portion extending spirally and connecting elastically between them.
In the pressure roller for shaping a tire member according to the present invention, it may be possible that
each roller piece has
an inner ring portion on the support shaft side,
an outer ring portion on the side in contact with the tire member, and
a connecting portion connecting elastically between the inner ring portion and the outer ring portion,
the connecting portion has
an inside part extending continuously along the outer peripheral surface of the inner ring portion and interrupted without making one turn around the outer peripheral surface,
an outside part extending continuously along the inner peripheral surface of the outer ring portion and interrupted without making one turn around the inner peripheral surface, and
a connecting part connecting between the outside part and the inside part,
the interrupted part of the inside part is formed so as to at least partially overlap with the interrupted part of the outside part on the inside thereof in the radial direction of the roller, and
the connecting part extends between
one end in the circumferential direction of the inside part and one end in the circumferential direction of the outside part, while inclining with respect to the radial direction of the roller.
In the pressure roller for shaping a tire member according to the present invention, it may be possible that the one end of the inside part is disposed on the inside in the roller's radial direction of the other end in the circumferential direction of the outside part, and the other end in the circumferential direction of the inside part is disposed on the inside in the roller's radial direction of the one end of the outside part.
In the pressure roller for shaping a tire member according to the present invention, it may be possible that a plurality of the connecting portions are provided between the inner ring portion and the outer ring portion.
In the pressure roller for shaping a tire member according to the present invention, the roller pieces may be shifted from each other in phases in the circumferential direction of the connecting portions.
In the pressure roller for shaping a tire member according to the present invention, it may be possible that
the outer ring portion has a structure comprising at least two layers of a first outer ring portion and a second outer ring portion disposed on the outside in the roller's radial direction of the first outer ring portion, and the elastic modulus of the second outer ring portion is smaller than the elastic modulus of the first outer ring portion.

Effect According to the Present Invention

The pressure roller for shaping a tire member according to the present invention has the support shaft, and a plurality of the elastically deformable roller pieces supported by the supporting shaft and arranged in the axial direction of the support shaft. The roller pieces are each independently rotatably supported by the support shaft.

Thus, in the pressure roller for shaping a tire member according to the present invention, it is possible to prevent the roller pieces from causing large twist even when rotated in a state where the roller pieces are displaced vertically along with the shape of the tire member having the uneven surface.

Accordingly, the pressure roller for shaping a tire member according to the present invention can be improved in the durability since breakage of the roller pieces can be prevented for long periods.

BRIEF DESCRIPTION OF THE DRAWINGS

FIG. 7 (a) is a perspective view showing an example of the roller piece of another embodiment according to the present invention. (b) is an enlarged perspective view of (a).

FIG. 10 (a) is a side view of the first roller piece. (b) is a side view of the second roller piece. (c) is a side view of the third roller piece.

Figure 1:
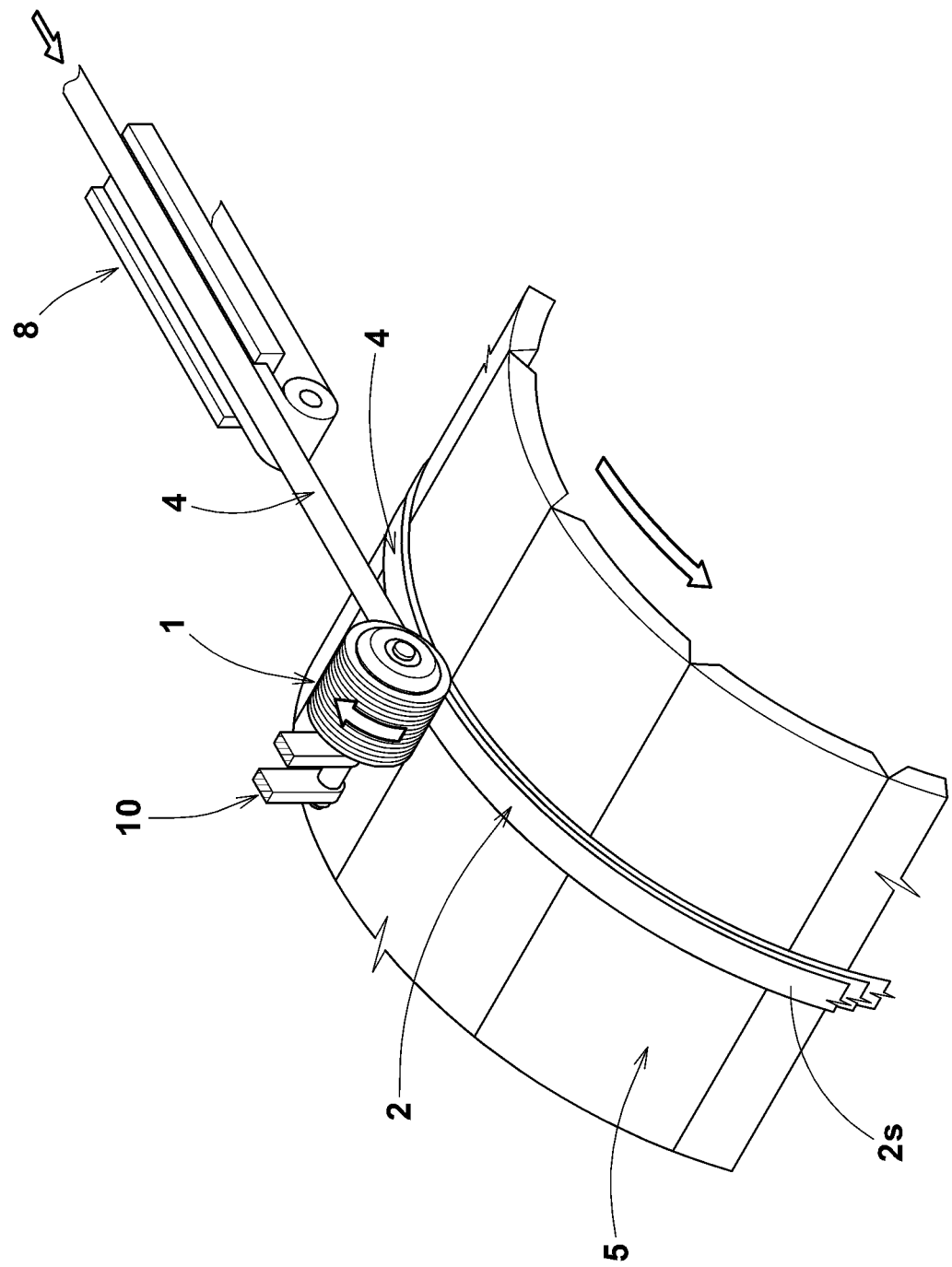
FIG. 1 A perspective view illustrating an example of a process of manufacturing a tire using the pressure roller for shaping a tire member according to the present invention.

DESCRIPTION OF THE REFERENCE NUMERALS 1 pressure roller
2 tire member
6 support shaft
7 roller piece
19 pressing surface

BEST MODE FOR CARRYING OUT THE INVENTION

Hereinafter, an embodiment according to the present invention will be described with reference to the accompanying drawings.

FIG. 1 is a perspective view illustrating an example of a tire manufacturing process using the pressure roller for shaping a tire member according to the present invention (hereinafter sometimes simply referred to as "pressure roller") 1.

The pressure roller 1 in this embodiment is intended for pressing a surface 2s of a tire member 2 formed from an unvulcanized rubber member.

The tire member 2 in this embodiment is, for example, formed by spirally stacking an unvulcanized rubber strip 4. The rubber strip 4 is fed from an applicator 8, and wound around a cylindrical shaping former 5.

In the present embodiment, air trapped between the stacked rubber strip 4, 4 is discharged by pressing the tire member 2 with the pressure roller 1.

For example, the pressure roller 1 can be used for shaping the tire member 2 or smoothing the surface 2s of the tire member 2.

Figure 2:
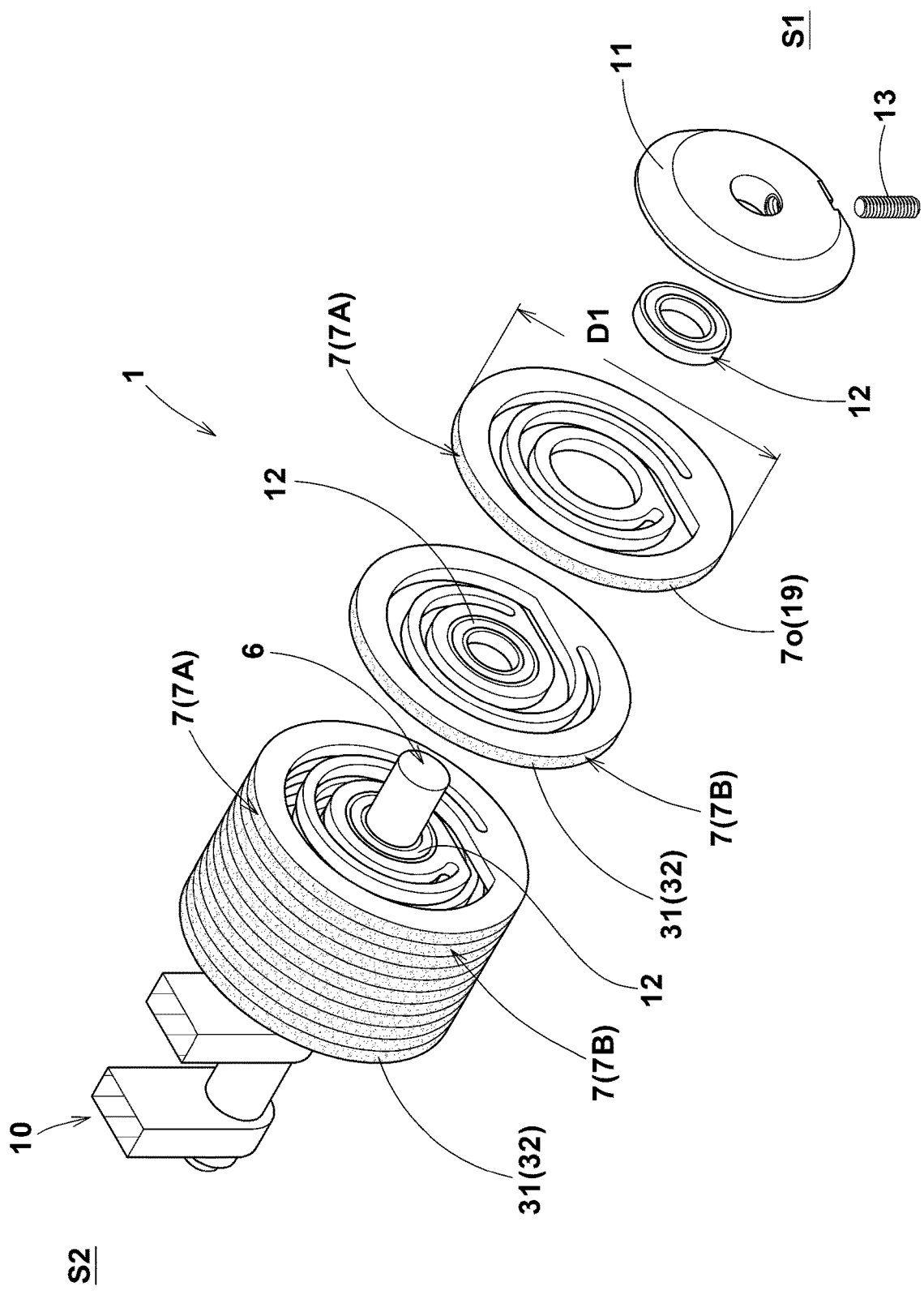
FIG. 2 An exploded perspective view of the pressure roller in FIG. 1.
Figure 3:
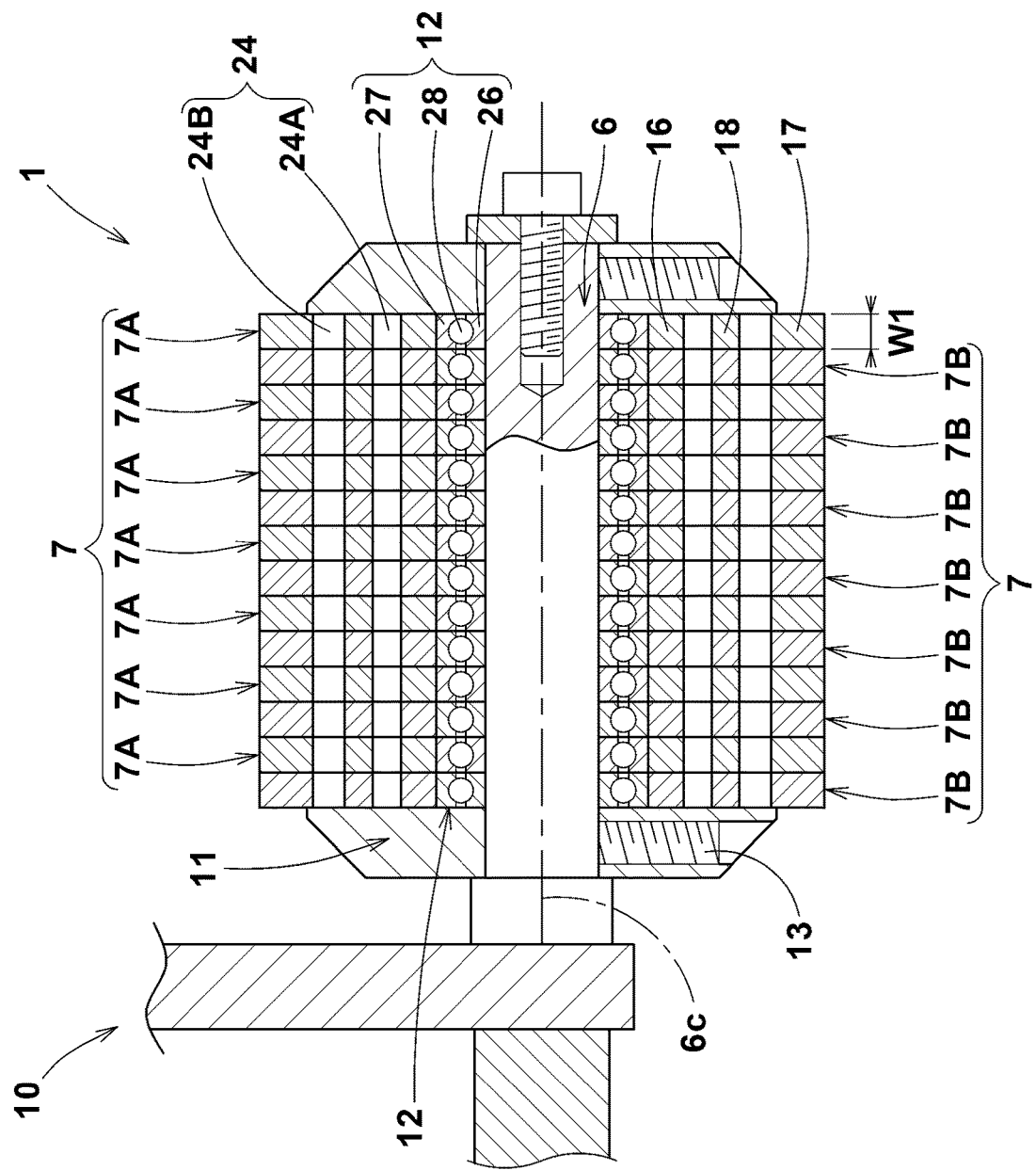
FIG. 3 A cross-sectional view of the pressure roller in FIG. 1.

FIG. 2 is an exploded perspective view of the pressure roller 1 in FIG. 1. FIG. 3 is a cross-sectional view of the pressure roller 1 in FIG. 1.

The pressure roller 1 in this embodiment is composed of a support shaft 6, and a plurality of roller pieces 7.

The axis 6c of the support shaft 6 in this embodiment extends in the horizontal direction.

The support shaft 6 is, for example, movably supported by an arm 10 attached to a drive means (not shown).

The arm 10 in this embodiment is fixed to one side in the axial direction of the support shaft 6.

Incidentally, the arms 10 may be, for example, fixed to both sides in the axial direction of the support shaft 6.

The support shaft 6 is provided with a pair of roller holding means 11, 11.

The pair of roller holding means 11, 11 are disposed on both outer sides in the axial direction of the plurality of roller pieces 7.

Such pair of roller holding means 11, 11 can prevent axial displacement of the plurality of roller pieces 7.

The pair of roller holding means 11, 11 in this embodiment are detachably attached to the support shaft 6 by the use of locking screws 13.

In such roller retaining means 11, 11, as the roller pieces 7 can be removed from the support shaft 6, it is possible to improve the maintainability of the roller pieces 7.

The plurality of roller pieces 7 are arranged side by side in the axial direction of the support shaft 6.

The roller pieces 7 in this embodiment are supported by the support shaft 6 through respective bearings 12 being independent from each other.

Figure 4:
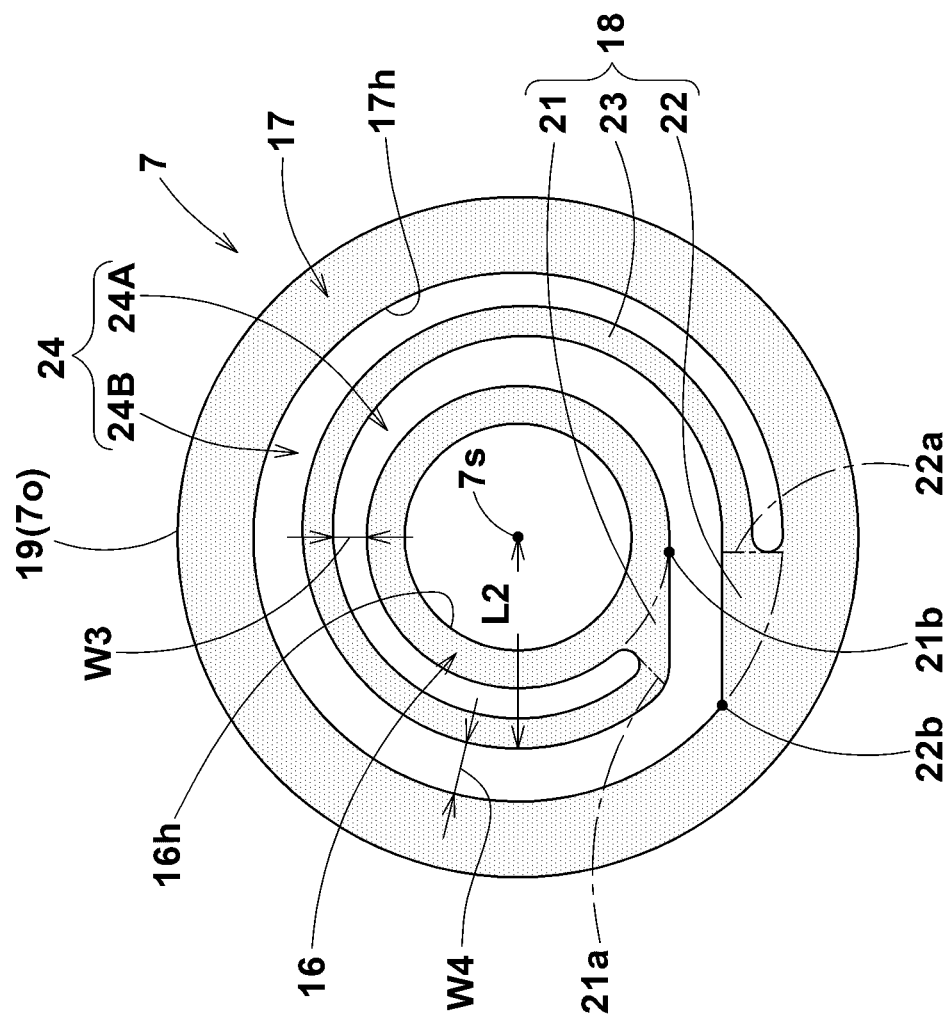
FIG. 4 A side view showing an example of the roller piece.

FIG. 4 is a side view showing an example of the roller piece 7.

The roller piece 7 is composed of an inner ring portion 16, an outer ring portion 17 and a connecting portion 18.

In this embodiment, the inner ring portion 16, the outer ring portion 17 and the connecting portion 18 are formed integrally.

The outer diameter D1 of the roller piece 7 (shown in FIG. 2) is, for example, set to be about 30 to 60 mm.

The width W1 of the roller piece 7 (shown in FIG. 3) is, for example, set to be about 2 to 8 mm.

The roller pieces 7 in this embodiment are, for example, made of a resin material.

As the resin material, for example, MC nylon (a registered trademark of Quadrant Polypenco Japan Ltd.), 6 nylon, PTFE (polytetrafluoroethylene) or the like can be employed. As the resin material in this embodiment, 6 nylon having a flexibility and impact resistance is employed.

Incidentally, the roller piece 7 is not limited to a resin material. For example, it may be of a metal or the like. Further, the inner ring portion 16, the outer ring portion 17 and the connecting portion 18 may be of different materials.

The inner ring portion 16 is disposed on the support shaft 6 (shown in FIG. 3) side. At the center of axis of the inner ring portion 16, there is provided with a circular hole 16h. Thereby, the inner ring portion 16 is formed in a ring shape. The inner diameter of the hole 16h is set to be approximately the same as the outer diameter of the bearings 12 (shown in FIGS. 2 and 3).

The outer ring portion 17 is disposed on the side contacting with the tire member 2 (shown in FIG. 1). At the center of axis of the outer ring portion 17, a circular hole 17h is provided. Thereby, the outer ring portion 17 is formed in a ring shape.

The inner diameter of the hole 17h in this embodiment is set to be larger than the outer diameter of the inner ring portion 16. The outer peripheral surface of the outer ring portion 17 (i.e., the outer peripheral surface 7o of the roller piece 7) is formed as a pressing surface 19 for contacting with the surface 2s of the tire member 2 (shown in FIG. 1).

The connecting portion 18 extends spirally and connects elastically between the inner ring portion 16 and the outer ring portion 17.

The connecting portion 18 in this embodiment is formed in a spiral shape in the side view thereof.

The connecting portion 18 in this embodiment is composed of an inside part 21, an outside part 22 and an connecting part 23. These inside part 21, outside part 22 and connecting part 23 are formed integrally.

The inside part 21 is fixed to the outer peripheral surface of the inner ring portion 16.

The inside part 21 in this embodiment is disposed on a part in the circumferential direction of the outer peripheral surface of the inner ring portion 16.

The outside part 22 is fixed to the inner peripheral surface of the outer ring portion 17.

The outside part 22 in this embodiment is disposed on a part in the circumferential direction of the inner peripheral surface of the outer ring portion 17.

The connecting part 23 extends spirally (helically) between the inside part 21 and outside part 22.

The connecting part 23 in this embodiment extends from one end 21a in the circumferential direction of the inside part 21 to one end 22a in the circumferential direction of the outside part 22, while increasing the distance L2 between the axis 7s of the roller piece 7 and the outer peripheral surface of the connecting part 23.

Further, a spirally (helically) extending gap 24 is formed between the connecting part 23 and the inner ring portion 16, and
between the connecting part 23 and the outer ring portion 17. Thereby, between the inner ring portion 16 and the outer ring portion 17, the connection part 23 can elastically deform. With such connecting part 23, the roller piece 7 is formed as being elastically deformable.

The gap 24 includes a first gap 24A between the inner ring portion 16 and the connecting portion 18, and
a second gap 24B between the outer ring portion 17 and the connecting portion 18.

The width W3 of the first gap 24A is gradually increased from one end 21a of the inside part 21 to one end 22a of the outside part 22.

On the other hand, the width W4 of the second gap 24B is gradually decreased from the other end 22b in the circumferential direction of the outside part 22 to the one end 22a. Thereby, in the roller piece 7, the amount of the elastic deformation of the connecting part 23 can be made uniform in the circumferential direction.

Figure 5:
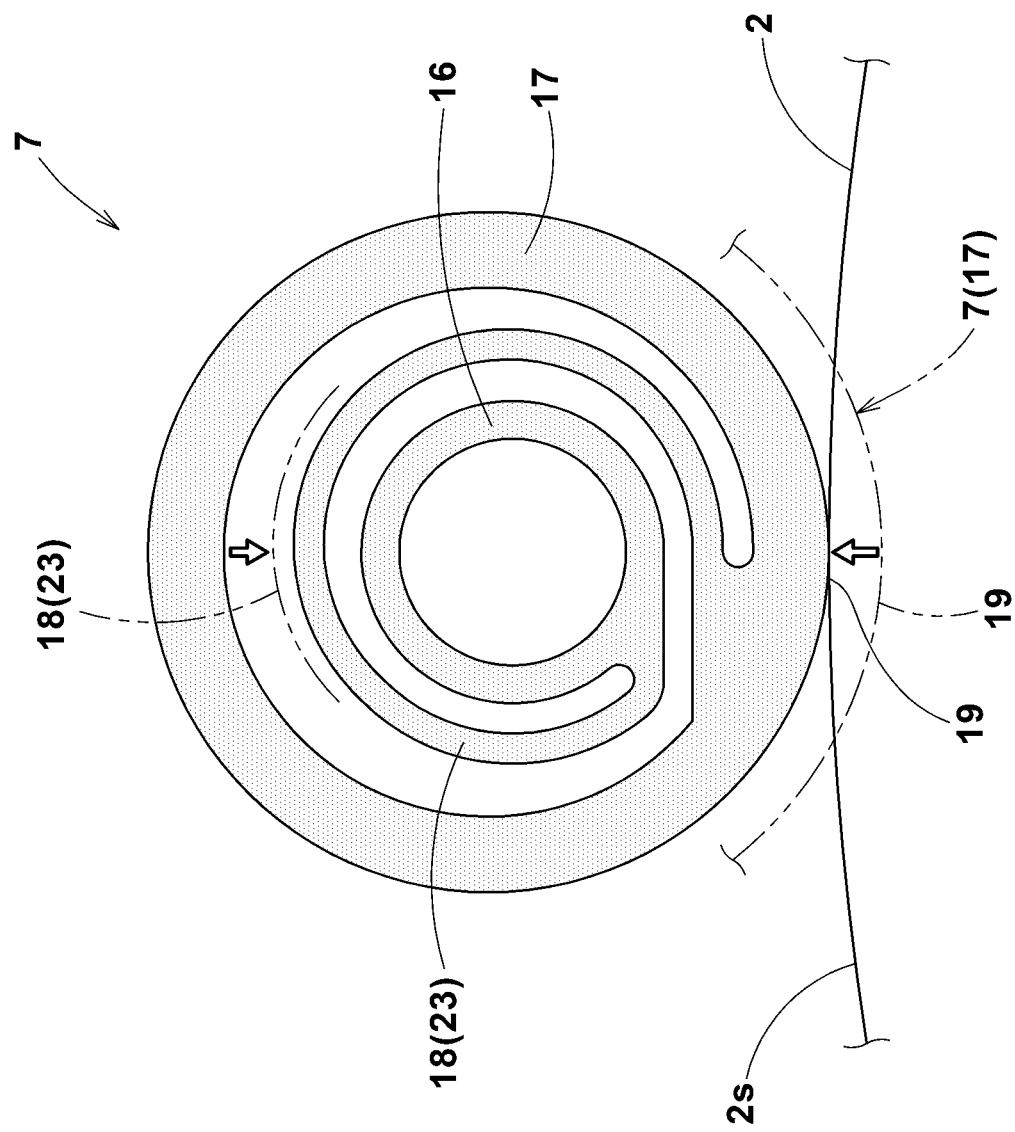
FIG. 5 A side view showing an example in which the roller piece is pressed onto the surface of the tire member.

FIG. 5 is a side view showing an example where the roller pieces 7 is pressed against the surface 2s of the tire member 2.

When the roller pieces 7 are pressed against the tire member 2, the connecting parts 23 of the connecting portions 18 are elastically deformed in the radial direction of the roller pieces 7.

By the elastic deformation of the connecting parts 23, the outer ring portions 17 are moved in the radial direction of the roller pieces 7, following the unevenness of the tire member 2. Thus, the roller pieces 7 can generate a reaction force against the surface 2s while the pressing surfaces 19 of the outer ring portions 17 follow the surface 2s of the tire member 2.

As shown in FIGS. 2 and 3, between the inner peripheral surface of the inner ring portion 16 of each roller piece 7 and the outer peripheral surface of the support shaft 6, the bearing 12 is disposed.

As shown in FIG. 3, the bearing 12 in this embodiment is configured similarly to the conventional bearing (rolling bearing).

The bearing 12 is composed of an inner ring 26, an outer ring 27 and rolling elements 28.

The roller pieces 7 are supported by the support shaft 6 independently rotatably from each other with such bearings 12.

The bearings 12 are not limited to the bearings in this embodiment as long as the roller pieces 7 can rotate independently from each other.

For the fixing of the bearing 12 and the inner ring portion 16, and the fixing of the bearing 12 and the support shaft 6, for example, an adhesive or the like is used.

Figure 6:
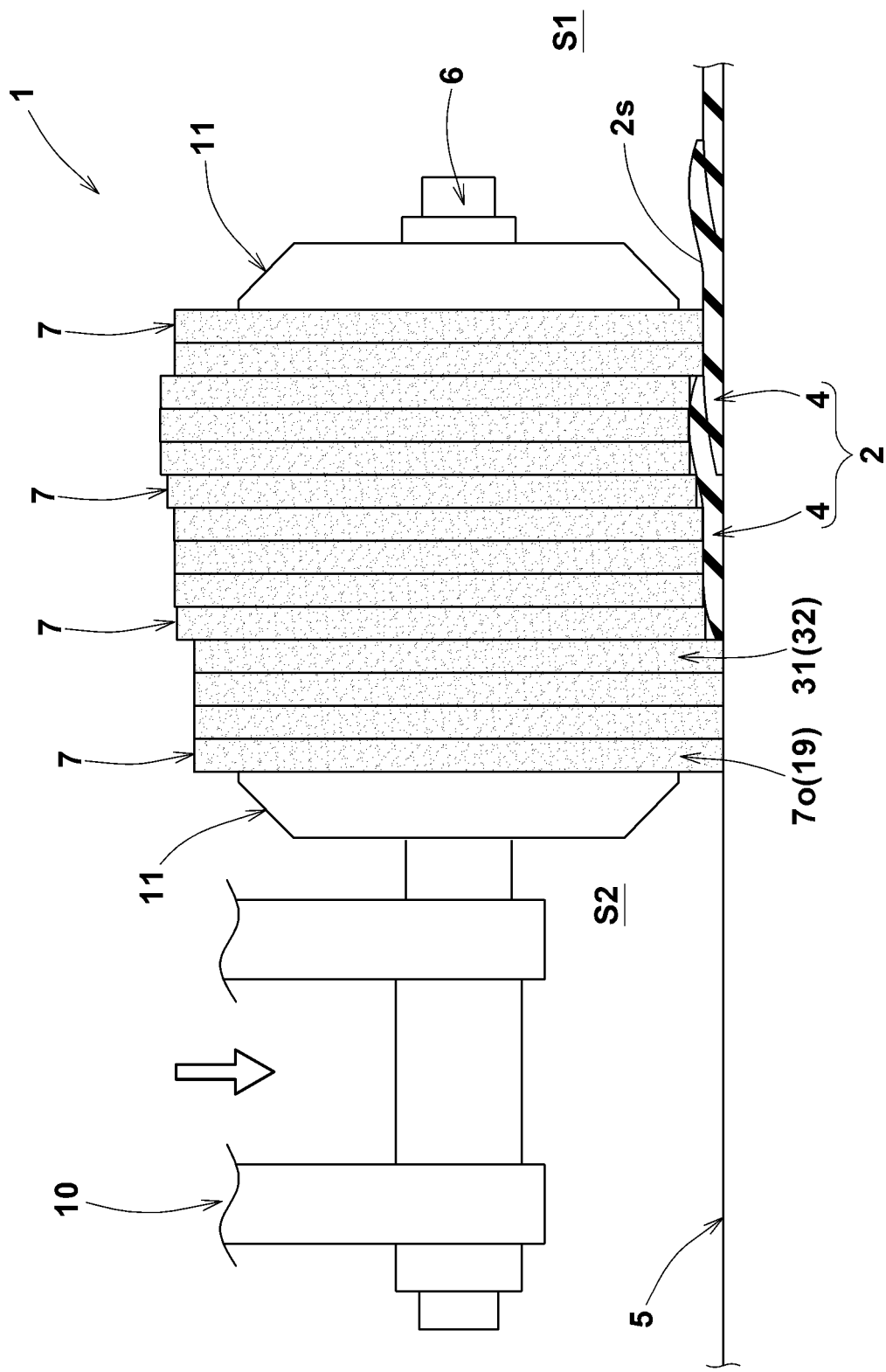
FIG. 6 A front view of the pressure roller pressed against the tire member.

FIG. 6 is a front view of the pressure roller 1 pressed against the tire member 2.

The pressure roller 1 can press the tire member 2 over a wide range in the axial direction of the support shaft 6 with the plurality of the roller pieces 7.

Further, the roller pieces 7 can independently and elastically deform, following the unevenness of the tire member 2, and thereby effectively generate reaction forces against the tire member 2.

Accordingly, the pressure roller 1 in this embodiment can effectively discharge air between the stacked rubber strip 4,4 by pressing the tire member 2.

The roller pieces 7 in this embodiment are supported by the support shaft 6 independently rotatably from each other.

In the pressure roller 1 in this embodiment, therefore, it is possible to prevent the roller pieces 7 from being largely twisted even when rotated in a state where the roller pieces 7 are displaced vertically along with the shape of the tire member 2 having the uneven surface.

In the connecting part 23 of the connecting portion 18, such twisting tends to cause breakage in the vicinity of the inside part 21, and breakage in the vicinity of the outside part 22. Accordingly, in the pressure roller 1 in this embodiment, as the breakage of the roller pieces 7 can be prevented for long periods, the durability can be improved.

As shown in FIG. 4, the spring rate of the roller piece 7 is not constant in the circumferential direction. Therefore, it is desirable that the roller pieces 7 are arranged along the support shaft 6 so that the spiral directions of the connecting portions 18 become opposite to each other as shown in FIGS. 2 and 3.

Thereby, in the pressure roller 1, it is possible to reverse the inclinations of the spring rates of the roller pieces 7A, 7B adjacent in the axial direction of the support shaft 6.

Accordingly, the spring rate of the pressure roller 1 can be evened (uniformed) in the circumferential direction.

Thus, the variation of the reaction force of the pressure roller 1 against the tire member 2 can be reduced.

On the other hand, the tire member 2 (shown in FIG. 6) is formed from an unvulcanized rubber member, and it has tackiness.

Therefore, when pressing the tire member 2 by the pressure roller 1, there is a possibility that the tire member 2 is stuck to the pressure roller 1, and it can not sufficiently press the tire member 2. It is therefore desirable for the pressure roller 1 that, as shown in FIG. 2, at least one of the roller pieces 7 is provided on the outer circumferential surface 7o (pressing surface 19) with an uneven portion 31 for preventing the sticking of the tire member 2.

The uneven portion 31 in this embodiment comprises a part having a ten-point average roughness (Rz) of 1.3 to 2.5 micrometers (hereinafter, simply referred to as "satin finished part") 32.

The ten-point average roughness (Rz) shall be measured according to JISB0601 (1994).

The satin finished part 32 can be formed by blasting the outer peripheral surface 7o of the roller piece 7.

Such uneven portion 31 can reduce the contact area between the outer peripheral surface 7o of the roller piece 7 and the surface 2s of the tire member 2.

Thus, the roller pieces 7 in this embodiment can prevent the tire member 2 from sticking to the outer circumferential surface 7o (i.e., the pressing surface 19).

Accordingly, the pressure roller 1 can effectively press the surface 2s of the tire member 2.

In this embodiment, the uneven portion 31 is formed in the outer peripheral surfaces 7o of all the roller pieces 7 constituting the pressure roller 1.

Thus, the pressure roller 1 in this embodiment can surely prevent the tire member 2 from sticking to the outer peripheral surfaces 7o of the roller pieces 7 (i.e., the pressing surface 19).

When the ten-point average roughness (Rz) of the uneven portion 31 is less than 1.3 micrometers, the contact area between the outer peripheral surfaces 7o of the roller pieces 7 and the tire member 2 can not become sufficiently small. When the ten-point average roughness (Rz) is more than 2.5 micrometers, as the contact area between the outer peripheral surfaces 7o of the roller pieces 7 and tire member 2 is reduced, it can not sufficiently press the surface 2s of the tire member 2.

From this point of view, the ten-point average roughness (Rz) is preferably not less than 1.6 micrometers and preferably not more than 2.2 micrometers.

The point average roughness (Rz) of the uneven portion 31 may differ for each roller piece 7, for example, in accordance with the adhesibility of the tire member 2 thereto. Especially, it is preferable to increase the ten-point average roughness (Rz) of the roller piece 7 to which the tire member 2 is easily adhered. Thereby, it is possible to effectively prevent the tire member 2 from adhering to the roller pieces 7.

In this embodiment, the uneven portion 31 comprises the satin finished part 32, but the uneven portion is not limited to such embodiment.

FIG. 7 (a) is a perspective view showing an example of the roller piece 7 of another embodiment according to the present invention, and (b) is an enlarged perspective view of (a).

Incidentally, descriptions of configurations in this embodiment which are the same as the former embodiment, may be omitted by giving the same reference numerals.

The uneven portion 31 in this embodiment comprises a knurled part 33.

The knurled part 33 in this embodiment is formed as a straight knurling comprising grooves 34 which are spaced in the circumferential direction of the roller pieces 7.

Incidentally, the knurled part 33 is not limited to such straight knurling.

For example, the knurled part 33 may be a cross knurling of crossing grooves 34.

Similarly to the satin finished part 32, such knurled part 33 can reduce the contact area between the outer peripheral surfaces 7o of the roller pieces 7 and the tire member 2.

Thus, the roller pieces 7 in this embodiment can effectively press the surface 2s of the tire member 2 while preventing the tire member 2 from adhering to the outer peripheral surfaces 7o of the roller pieces 7 (i.e., the pressing surface 19).

The groove width W5 of the grooves 34 of the knurled part 33 can be set appropriately.

If the groove width W5 is small, the contact area between the outer peripheral surfaces 7o of the roller pieces 7 and the tire member 2 can not become sufficiently small.

If the groove width W5 is large, the contact area between the outer peripheral surfaces 7o of the roller pieces 7 and the tire member 2 becomes smaller, and it may not press the surface 2s of the tire member 2 sufficiently.

From this point of view, the groove width W5 is preferably not less than 0.5 mm and preferably not more than 2.0 mm. Similarly, the depth D5 of the grooves 34 is preferably not less than 0.5 mm and preferably not more than 2.0 mm.

The groove width W5 and the depth D5 of the grooves 34 may be differ for each roller piece 7, for example, in accordance with the adhesibility of the tire member 2 thereto. Especially, it is preferable to increase the groove width W5 and the depth D5 of the grooves 34 of the roller piece 7 to which the tire member 2 is easily adhered. Thereby, it is possible to effectively prevent the tire member 2 from adhering to the roller pieces 7.

The grooves 34 may be inclined with respect to the axial direction of the roller pieces 7.

In the case of such uneven portion 31, it is possible to increase the length of the ridge lines of the knurled part 33 contacting with the surface 2s of the tire member 2 (shown in FIG. 1), and it is possible to reduce the biting into the surface 2s of the tire member 2.

It is preferable that the angles of the grooves 34 with respect to the roller's axial direction are 0 to 30 degrees.

Thereby, streaky unevenness (not shown) extending in the longitudinal direction of the tire member 2 can be prevented from being formed in the surface 2s of the tire member 2 (shown in FIG. 1) by the uneven portion 31.

For example, the pressure roller 1 may include the roller piece 7 provided with the satin finished part 32 (shown in FIG. 2) and the roller piece 7 provided with the knurled part 33 (shown in FIG. 7 (a)) in combination in accordance with the tackiness of the tire member 2.

Incidentally, compared with the satin finished part 32, the knurled part 33 can effectively decrease the contact area between the outer peripheral surface 7o of the roller piece 7 and tire member 2.

Such pressure roller 1 can effectively prevent the tire member 2 from adhering to the outer peripheral surfaces 7o of the roller pieces 7 (pressing surface 19).

As shown in FIG. 4, the connecting portion 18 in the former embodiments extends spirally between the inner ring portion 16 and the outer ring portion 17 to elastically connect therebetween. However, it is not limited to this.

Figure 8:
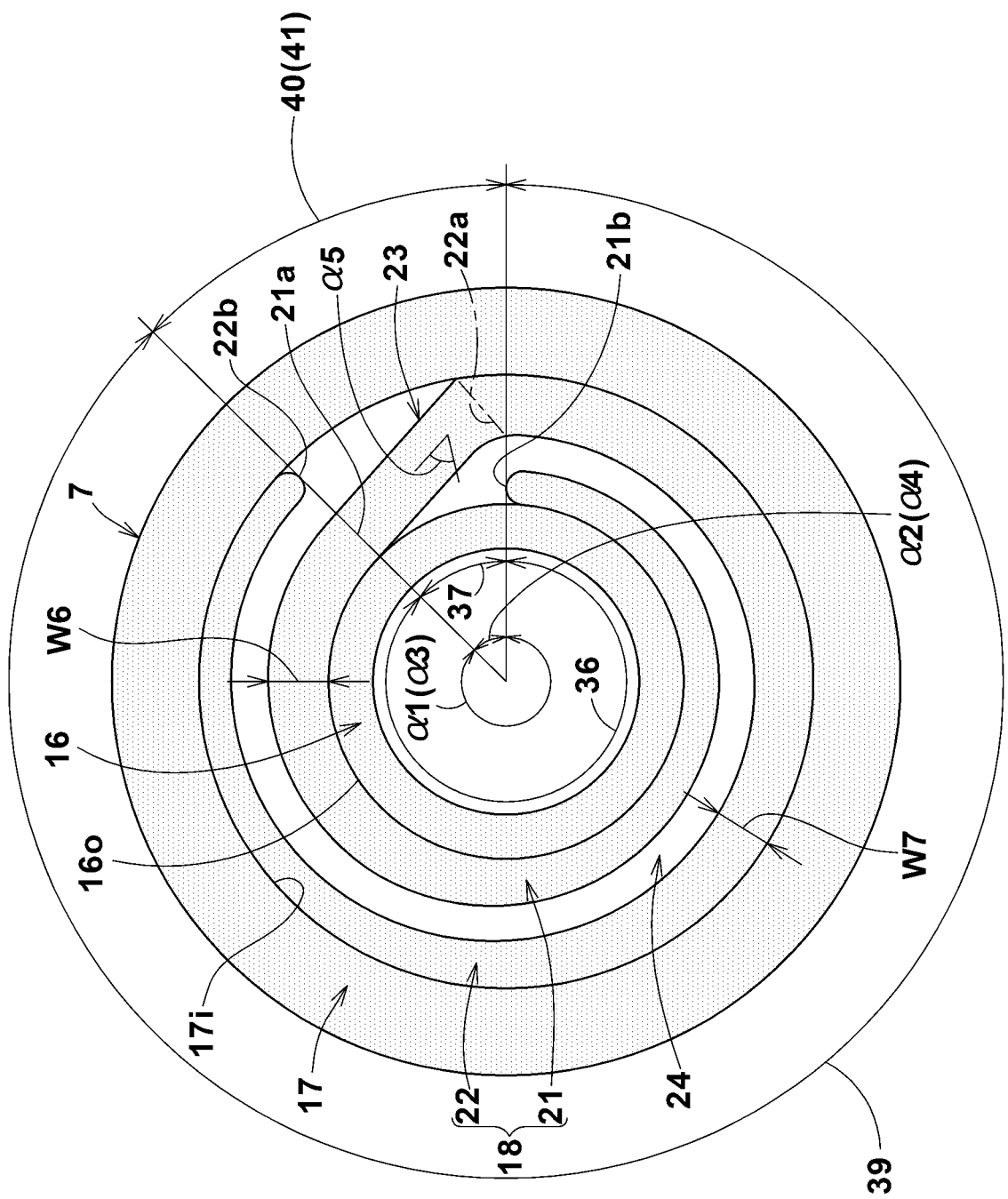
FIG. 8 A side view showing an example of the roller piece of yet another embodiment according to the present invention.

FIG. 8 is a side view showing an example of the roller piece of yet another embodiment according to the present invention. Incidentally, descriptions of configurations in this embodiment which are the same as the former embodiment, may be omitted by giving the same reference numerals.

The connecting portion 18 connects between the inner ring portion 16 and the outer ring portion 17 elastically. In this embodiment, the inner ring portion 16, the outer ring portion 17 and the connecting portion 18 are formed integrally. The connecting portion 18 is composed of an inside part 21, an outside part 22 and an connecting part 23. These inside part 21, outside part 22 and connecting part 23 are formed integrally.

The inside part 21 is fixed to the outer peripheral surface 16o of the inner ring portion 16.

The inside part 21 in this embodiment extends continuously in the circumferential direction along the outer peripheral surface 16o of the inner ring portion 16. Thereby, the inside part 21 is formed in an arc shape.

The inside part 21 in this embodiment extends in the circumferential direction while gradually decreasing its thickness W6 from its one end 21a in the circumferential direction toward the other end 21b.

The other end 21b in this embodiment is formed in an arc shape protruding convexly toward the outside in the circumferential direction.

The inside part 21 is interrupted without making one turn around the outer peripheral surface 16o of the inner ring portion 16. Thereby, on the outer peripheral surface 16o of the inner ring portion 16, there are formed
a region 36 in which the inside part 21 is disposed (hereinafter, sometimes simply referred to as "inside-part disposed region") and
a region 37 in which the inside part 21 is discontinuous (hereinafter, sometimes simply referred to as "inside-part discontinuous region").

The inside-part disposed region 36 in this embodiment is set in an angular range such that the center angle α1 around the axis of the roller pieces 7 is from 270 to 330 degrees. Thereby, the inner part 21 is firmly fixed to the outer peripheral surface 16o of the inner ring portion 16.

The outside part 22 is fixed to the inner peripheral surface 17i of the outer ring portion 17.

The outside part 22 in this embodiment extends continuously in the circumferential direction along the inner peripheral surface 17i of the outer ring portion 17. Thereby, the outside part 22 is formed in an arc shape.

The outside part 22 in this embodiment extends in the circumferential direction, while gradually decreasing its thickness W7 from its one end 22a in the circumferential direction toward the other end 22b.

The other end 22b in this embodiment is formed in an arc shape protruding convexly toward the outside in the circumferential direction.

The outside part 22 is interrupted without making one turn around the inner peripheral surface 17i of the outer ring portion 17. Thereby, on the inner peripheral surface 17i of the outer ring portion 17, there are formed
a region 39 in which the outside part 22 is disposed (hereinafter, sometimes simply referred to as "outside-part disposed region") and
a region 40 in which the outside part 22 is discontinuous (hereinafter, sometimes simply referred to as "outside-part discontinuous region").

Incidentally, as in this embodiment, when the one end 22a of the outside part 22 is inclined with respect to the radial direction of the roller, the outside-part disposed region 39 and the outside-part discontinuous region 40 are determined by the innermost end position in the circumferential direction of the end 22a of the outside part 22.

The center angle α3 around the axis of the roller piece 7 of the outside-part disposed region 39 in this embodiment is set to the same range as the central angle α1 of the inside-part disposed region 36.

Thereby, the outside part 22 is firmly fixed to the inner peripheral surface 17i of the outer ring portion 17.

Further, in this embodiment, at least a part of the inside-part discontinuous region 37 overlaps with the outside-part discontinuous region 40 on the inside in the radial direction of the roller (i.e., they face each other in the radial direction of the roller).

The connecting part 23 is for connecting between the inside part 21 and outside part 22.

The connecting part 23 in this embodiment extends between one end 21a of the inside part 21 and one end 22a of the outside part 22, while inclining with respect to the radial direction of the roller.

Figure 9:
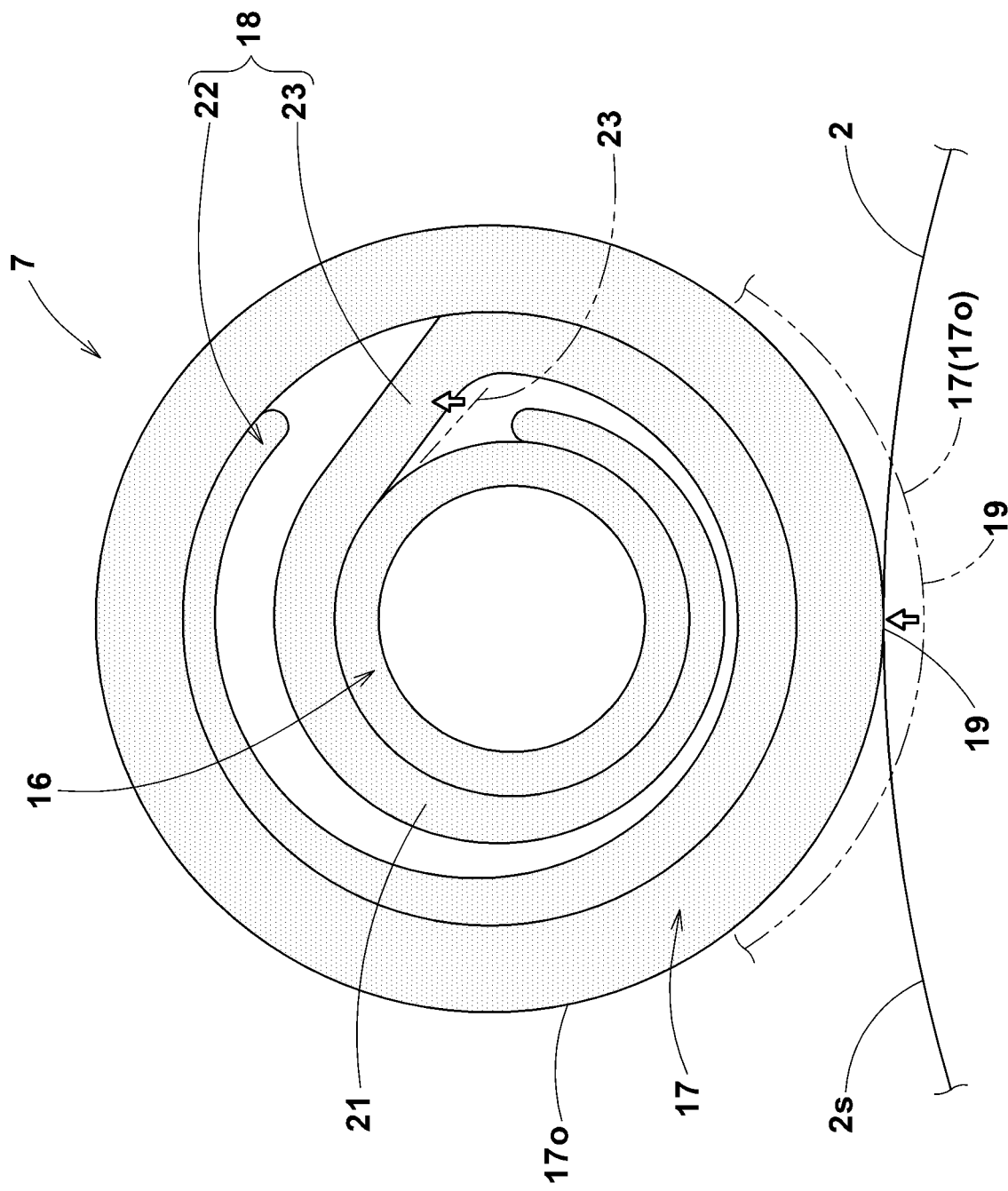
FIG. 9 A side view showing a state of the roller piece shown in FIG. 8 which is pressed against the surface of the tire member.

FIG. 9 is a side view showing a state where the roller pieces of FIG. 8 are pressed against the surface 2s of the tire member 2.

When the roller piece 7 is pressed against the surface 2s of the tire member 2, the connecting part 23 is elastically deformed in the radial direction of the roller.

Owing to the elastic deformation of the connecting part 23, the outer ring portion 17 is moved in the radial direction of the roller piece 7, following the unevenness of the tire member 2. Thereby, the roller pieces 7 can generate reaction forces against the surface 2s, while enabling the pressing surface 19 of the outer ring portions 17 to follow the surface 2s of the tire member 2.

For example, as compared with the connecting part 23 of the former embodiment (FIG. 4) which extends spirally in the circumferential direction of the roller piece 7, the region (length in the circumferential direction) in which the connecting part 23 in this embodiment is disposed in the circumferential direction of the roller piece 7 becomes smaller. Accordingly, as compared with the connecting part 23 of the front embodiment (shown in FIG. 4), the connecting part 23 in this embodiment can be increased in the rigidity.

Therefore, the roller piece 7 in this embodiment can generate a sufficient reaction force to the surface 2s of the tire member 2.

Moreover, the connecting part 23 in this embodiment extends straight.
For example, as compared with the connecting part 23 (shown in FIG. 4) of the former embodiment which extends spirally in the circumferential direction of the roller piece 7, such straight connecting part 23 can be effectively increased in its rigidity. Therefore, the roller piece 7 in this embodiment can generate a large reaction force to the surface 2s of the tire member 2. In order to improve the follow ability to the unevenness of the surface 2s of the tire member 2 and the reaction force in a well-balanced manner, it is preferred that the maximum stroke of the roller piece 7 caused by the elastic deformation of the connecting part 23 (i.e., the displacement of the inner ring portion 16 relative to the outer ring portion 17) is about 5 to 20 mm.

As shown in FIG. 8, the connecting part 23 is disposed in a region where the inside-part discontinuous region 37 overlaps with the outside-part discontinuous region 40 (hereinafter, sometimes simply referred to as "overlap region") 41.
Such connecting part 23 is disposed in a wider range in the radial direction of the roller, for example, when compared with the case where it is disposed in a region where the inside-part discontinuous region 37 does not overlap with the outside-part discontinuous region 40.
Thereby, the connecting part 23 can be increased in the amount of deformation in the radial direction of the roller. Thus, the connecting part 23 can prevent the reaction force to the surface 2s of the tire member 2 (shown in FIG. 6) from becoming larger than necessary.

In the connecting portion 18 in this embodiment, one end 21a of the inside part 21 is disposed on the inside in the roller's radial direction of the other end 22b of the outside part 22.
Further, in the connecting portion 18 in this embodiment, the other end 21b of the inside part 21 is disposed on the inside in the roller's radial direction of one end 22a of the outside part 22.
Thereby, it is possible to coincide the inside-part discontinuous region 37 and the outside-part discontinuous region 40 with each other in the roller's radial direction.
The expression "coincide in the roller's radial direction" means that the center angle α2 of the inside-part discontinuous region 37 is equal to the central angle α4 of the outside-part discontinuous region 40.
Accordingly, as the connecting part 23 in this embodiment is disposed only in the overlap region 41, the connecting part 23 is surely disposed in a wider range in the roller's radial direction.
Thereby, it is possible to increase the amount of deformation in the roller's radial direction of the connecting part 23, therefore, the reaction force by the roller piece 7 to the tire member 2 (shown in FIG. 9) can be prevented from becoming larger than necessary.
In order to exert such effects effectively, it is preferred that the center angle α2 of the inside-part discontinuous region 37 and the central angle α4 of the outside-part discontinuous region 40 are set to 30 to 90 degrees.

The angle α5 of the connecting part 23 with respect to the roller's radial direction can be appropriately set.
If the angle α5 is small, there is a possibility that the reaction force by the roller piece 7 to the tire member 2 (shown in FIG. 9) becomes large. If the angle α5 is large, there is a possibility that a sufficient reaction force to the surface 2s of the tire member 2 becomes no longer generated.
From this standpoint, the angle α5 is preferably set to 30 to 70 degrees.

On the other hand, as the connecting part 23 is disposed in a limited range in the circumferential direction of the roller piece 7 (in this embodiment, in the overlapping region 41), the reaction force to the surface 2s of the tire member 2 (shown in FIG. 6) is liable to vary according to the rotation angle of the roller piece 7.
Therefore, it is preferable that the connecting portions 18 of the roller pieces 7 of the pressure roller 1 (shown in FIG. 6) are respectively shifted in the phases in the circumferential direction.
Thereby, the pressure roller 1 can prevent the variation in the reaction force to the surface 2s of the tire member 2.

FIG. 10 (a) is a side view of the first roller piece 7a among the plurality of the roller pieces 7 which is the first to one side S1 (shown in FIG. 6).
FIG. 10 (b) is a side view of the second roller piece 7b which is the second to the one side S1.
FIG. 10 (c) is a side view of the third roller pieces 7c which is the third to the one side S1.
Thus, in this embodiment, the phases in the circumferential direction of the connecting portions 18 of the roller pieces 7 are gradually shifted from the one side S1 in the axial direction toward the other side S2 (shown in FIG. 6) of the support shaft 6. Thereby, in the pressure roller 1, the variation of the reaction force to the surface 2s of the tire member 2 can be effectively prevented.

If the phase shift in the circumferential direction between the roller pieces 7, 7 adjacent in the axial direction of the support shaft 6 (shown in FIG. 6) is large,
there is a possibility that it becomes difficult to uniformly generate reaction forces to the surface 2s of the tire member 2 (shown in FIG. 6).
It is therefore, preferable that the phase shift in the circumferential direction between every two of the roller pieces 7, 7 adjacent in the axial direction of the support shaft 6 is 10 degrees to 30 degrees.

Figure 11:
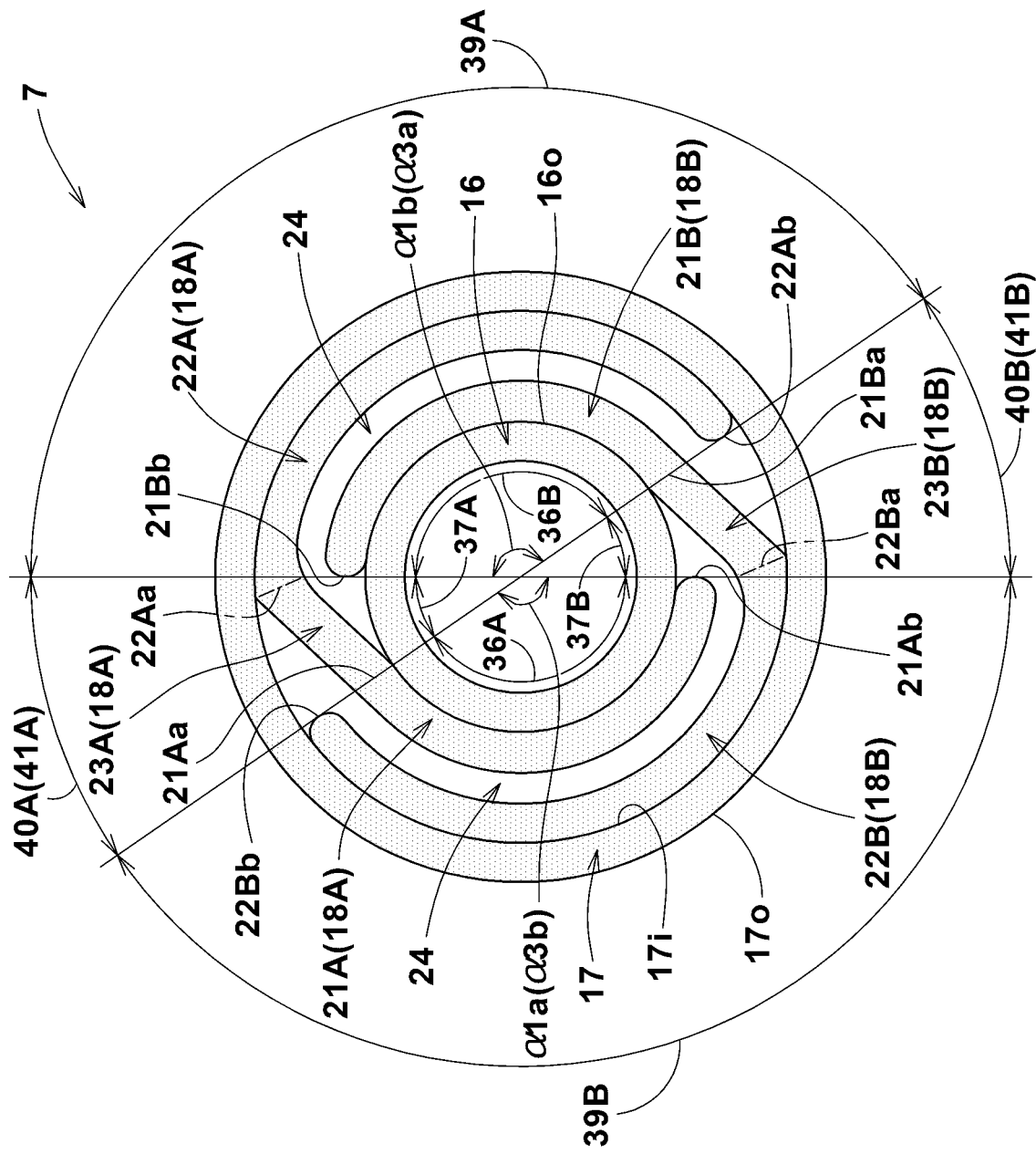
FIG. 11 A side view showing an example of the roller piece of yet another embodiment according to the present invention.

In the former embodiment, the roller piece 7 in which one connecting portion 18 is disposed between the inner ring portion 16 and the outer ring portion 17, is exemplified. But, the roller piece 7 is not limited to such example.
For example, a plurality of connecting portions 18 may be provided between the inner ring portion 16 and the outer ring portion 17.
FIG. 11 is a side view showing an example of the roller piece 7 of yet another embodiment according to the present invention. Incidentally, descriptions of configurations in this embodiment which are the same as the former embodiment, may be omitted by giving the same reference numerals.

In this embodiment, the roller piece 7 comprises a pair of connecting portions 18A, 18B.
The pair of connecting portions in this embodiment is classified into one connecting portion 18A and the other connecting portion 18B.

The one connecting portion 18A comprises one inside part 21A, one outside part 22A and one connecting part 23A. These one inside part 21A, one outside part 22A and one connecting part 23A are formed integrally.
The other connecting portion 18B comprises other inside part 21B, other outside part 22B and other connecting part 23B. These other inside part 21B, other outside part 22B and other connecting part 23B are formed integrally.

The one inside part 21A and the other inside part 21B are respectively fixed to the outer peripheral surface 16o of the inner ring portion 16.

The one inside part 21A and the other inside part 21B in this embodiment extend continuously in the circumferential direction along the outer peripheral surface 16o of the inner ring portion 16.

Thereby, the one inside part 21A and the other inside part 21B are formed in an arc shape.

The one inside part 21A and the other inside part 21B in this embodiment respectively extend in the circumferential direction, while keeping the thickness constant.

The one inside part 21A and the other inside part 21B are interrupted without making one turn around the outer peripheral surface 16o of the inner ring portion 16.

Further, one end 21Aa in the circumferential direction of the one inside part 21A and the other end 21Bb in the circumferential direction of the other inside part 21B are disposed so as to be spaced apart in the circumferential direction.

Further, the other end 21Ab in the circumferential direction of the one inside part 21A and one end 21Ba in the circumferential direction of the other inside part 21B are disposed so as to be spaced apart in the circumferential direction.

Thereby, on the outer peripheral surface 16o of the inner ring portion 16, there are formed
a region where the one inside part 21A is disposed (hereinafter, sometimes simply referred to as "one-inside-part disposed region") 36A, and
a region where the other inside part 21B is disposed (hereinafter, sometimes simply referred to as "other-inside-part disposed region") 36B, and,
a region where the one inside part 21A and the other inside part 21B are interrupted (hereinafter, sometimes simply referred to as "inside-part discontinuous region").

The inside-part discontinuous region includes one inside-part discontinuous region 37A, and
the other inside-part discontinuous region 37B.

The one inside-part discontinuous region 37A is a region between the one end 21Aa of the inside part 21A and
the other end 21Bb of the other inside part 21B.

The other inside parts broken area 37B is a region between the other end 21Ab of the one inside part 21A and
the one end 21Ba of the other inside part 21B.

The center angles α1a, α1b around the axis of the roller pieces 7, of the one inside-part disposed region 36A and the other inside-part disposed region 36B are set in an angular range from 100 to 150 degrees.

Thereby, the one inside part 21A and the other inside part 21B are firmly fixed to the outer peripheral surface 16o of the inner ring portion 16.

The one outside part 22A and the other outside part 22B are each fixed to the inner peripheral surface 17i of the outer ring portion 17.

The one outside part 22A and the other outside part 22B in this embodiment extend continuously in the circumferential direction along the inner peripheral surface 17i of the outer ring portion 17.

Thereby, the one outside part 22A and the other outside part 22B are formed in an arc shape.

The one outside part 22A and the other outside part 22B in this embodiment each extend in the circumferential direction, while keeping the thickness constant.

The one outside part 22A and the other outside part 22B are interrupted without making one turn around the inner peripheral surface 17i of the outer ring portion 17.

One end 22Aa in the circumferential direction of the one outside part 22A and
the other end 22Bb in the circumferential direction of the other outside part 22B
are spaced apart from each other in the circumferential direction.

Further, the other end 22Ab in the circumferential direction of the one outside part and
one end 22Ba in the circumferential direction of the other outside part 22B
are spaced apart from each other in the circumferential direction.

Thereby, on the inner peripheral surface 17i of the outer ring portion 17, there are formed
a region where the one outside part 22A is disposed (hereinafter, sometimes simply referred to as "one outside-part disposed region") 39A,
a region where the other outside part 22B is disposed (hereinafter, sometimes simply referred to as "other outside-part disposed region") 39B, and,
a region where the one outside part 22A and the other outside part 22B are interrupted (hereinafter, sometimes simply referred to as "outside-part discontinuous region").

The outside-part discontinuous region includes one outside-part discontinuous region 40A, and the other outside-part discontinuous region 40B.

The one outside-part discontinuous region 40A is a region between the one end 22Aa of the one outside part 22A and the other end 22Bb of the other outside part 22B.

The other outside-part discontinuous region 40B is a region between the one end 22Ba of the other outside part 22B and the other end 22Ab of the one outside part 22A.

The center angles α3a, α3b round the axis of the roller pieces 7, of the one outside-part disposed region 39A and the other outside-part disposed region 39B are set in an angle range from 100 to 150 degrees.

Thereby, the one outside part 22A and the other outside part 22B are firmly fixed to the inner peripheral surface 17i of the outer ring portion 17.

The one outside part 22A is provided without overlapping with the one inside part 21A on its outside in the roller's radial direction.

In this embodiment, the one outside part 22A and the one inside part 21A are arranged at symmetrical positions across the axis of the roller pieces 7.

The other outside part 22B is provided without overlapping with the other inside part 21B on the outside in the roller's radial direction.

In this present embodiment, the other outside part 22B and the other inside part 21B are arranged at symmetrical positions across the axis of the roller pieces 7.

In this embodiment, at least a part of the one inside-part discontinuous region 37A overlaps with the one outside-part discontinuous region 40A on its inside in the roller's radial direction (i.e., they face each other in the radial direction of the roller).

Further, at least a part of the other inside-part discontinuous region 37B overlaps with the other outside-part discontinuous region 40B on its inside in the roller's radial direction.

The one connecting part 23A in this embodiment extends between the one end 21Aa of the one inside part 21A and the one end 22Aa of the one outside part 22A, while inclining with respect to the radial direction of the roller.

Also, the other connecting part 23B extends between the one end 21Ba of the other inside part 21B and the one end 22Ba of the other outside part 22B, while inclining with respect to the radial direction of the roller.

Therefore, in the same manner as the connecting part 23 (shown in FIG. 8) in the former embodiment, the region (length in the circumferential direction) in which the one connecting part 23A and the other connecting part 23B in this embodiment are disposed in the circumferential direction, can be decreased. Thereby, as the one connecting part 23A and the other connecting part 23B can be increased in the rigidity in comparison with the connection part 23 shown in FIG. 4, they can generate a sufficient reaction force to the surface 2s of the tire member 2 (shown in FIG. 6).

Moreover, the one connecting part 23A and the other connecting part 23B in this embodiment extends straight. Therefore, the one connecting part 23A and the other connecting part 23B can be effectively increased in the rigidity, for example, as compared with the connecting part 23 (shown in FIG. 4) of the former embodiment which extends spirally in the circumferential direction of the roller piece 7. Thereby, the roller piece 7 in this embodiment can generate a large reaction force to the surface 2s of the tire member 2 (shown in FIG. 6).

In this embodiment, since both of the one connecting part 23A and the other connecting part 23B are provided, a larger reaction force can be generated in comparison with the former embodiment having a single connecting part 23 shown in FIG. 8.

Further, the one connecting part 23A and the other connecting part 23B are arranged at symmetrical positions across the axis of the roller piece 7.

Thereby, as compared with the connecting part 23 (shown in FIG. 8) where arranged only in a partial region in the circumferential direction of the roller piece 7, the one connecting part 23A and the other connecting part 23B can give a uniform reaction force to the surface 2s of the tire member 2.

The one connecting part 23A is disposed in a region (hereinafter, sometimes simply referred to as "one overlap region") 41A where the one inside-part discontinuous region 37A and the one outside-part discontinuous region 40A overlap with each other.

Such one connecting part 23A can be disposed in a wider range in the roller's radial direction, for example, as compared with the case where it is disposed in a region where the one inside-part discontinuous region 37A does not overlap with the one outside-part discontinuous region 40A.

The other connecting part 23B is disposed in a region (hereinafter, sometimes simply referred to as "other overlap region") 41B where the other inside-part discontinuous region 37B and the other outside-part discontinuous region 40B overlap with each other.

Such other connecting part 23B can be disposed in a wider range in the roller's radial direction, for example, as compared with the case where the other inside-part discontinuous region 37B does not overlap with the other outside-part discontinuous region 40B.

Thus, as the one connecting part 23A and the other connecting part 23B can increase the amount of the deformation thereof in the roller's radial direction, it is possible to prevent the reaction force to the surface 2s of the tire member 2 (shown in FIG. 6) from becoming larger than necessary.

In the one connecting portions 18A in this embodiment, the one end 21Aa of the one inside part 21A is disposed on the inside in the roller's radial direction of the other end 22Bb of the other outside part 22B.

Further, in this embodiment, the other end 21Bb of the other inside part 21B is disposed on the inside in the roller's radial direction of the one end 22Aa of the one outside part 22A.

Thereby, as the one inside-part discontinuous region 37A and the one outside-part discontinuous region 40A can coincide with each other in the roller's radial direction, it is preferable to arrange the one connecting part 23A placing only in the one overlap region 41A.

Therefore, the amount of deformation in the roller's radial direction of the one connecting part 23A can be increased, and it is possible to prevent the reaction force to the surface 2s of the tire member 2 (shown in FIG. 6) from becoming larger than necessary.

In this embodiment, the one end 21Ba of the other inside part 21B is disposed on the inside in the roller's radial direction of the other end 22Ab of the one outside part 22A. Further, in this embodiment, the other end 21Ab of the one inside part 21A is disposed on the inside in the roller's radial direction of the one end 22Ba of the other outside part 22B. Thereby, as the other inside-part discontinuous region 37B and the other outside-part discontinuous region 40B can coincide with each other in the roller's radial direction, it is possible to dispose the other connecting part 23B only in the other overlap region 41B.

Therefore, the other connecting part 23B is able to increase the amount of deformation in the radial direction of the roller, and it is possible to prevent the reaction force to the surface 2s of the tire member 2 (shown in FIG. 6) from becoming larger than necessary.

In this embodiment, the roller piece 7 provided with two connecting portions 18A, 18B between the inner ring portion 16 and the outer ring portion 17, is exemplified. But, the roller piece 7 is not limited to this example.

For example, three or more connecting portions 18 may be provided between the inner ring portion 16 and the outer ring portion 17.

Figure 12:
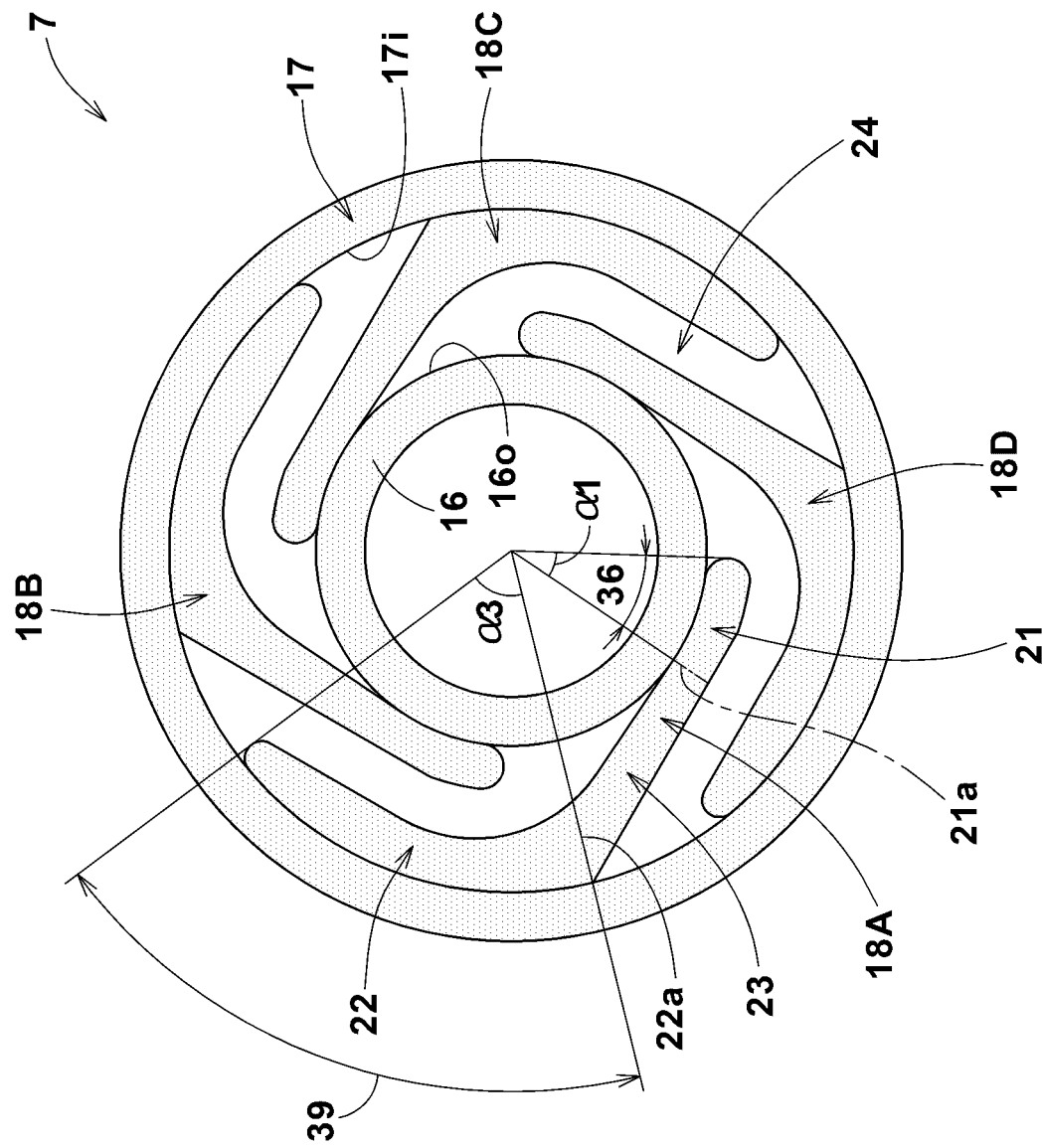
FIG. 12 A side view showing an example of the roller piece of yet another embodiment according to the present invention.

FIG. 12 is a side view showing an example of the roller piece 7 of a further embodiment according to the present invention. Incidentally, descriptions of configurations in this embodiment which are the same as the former embodiment, may be omitted by giving the same reference numerals.

The roller piece 7 in this embodiment is provided with four connecting portions 18A, 18B, 18c and 18D.

The connecting portions 18A to 18D each have an inside part 21, an outside part 22 and an connecting part 23.

In each of the connecting portions 18A to 18D in this embodiment, the center angle $\alpha 3$ of the outside-part disposed region 39 is set to be larger than the central angle $\alpha 1$ of the inside-part disposed region 36, and it is formed in a substantially L-shaped in the side view.

Such connecting portions 18A to 18D can make the rigidity of the inside part 21 smaller than the rigidity of the outside part 22.

Thereby, the connecting portions 18A to 18D can make the elastic deformation of the connecting part 23 in an inside part 21 side relatively large, and can increase the amount of deformation in the radial direction of the roller.

Therefore, each of the connecting portions 18A to 18D can prevent the reaction forces to the surface 2s of the tire member 2 (shown in FIG. 6) from becoming larger than necessary.

Further, the connecting parts 23 of the respective connecting portions 18A to 18D are arranged evenly in the circumferential direction of the roller piece 7.

Thereby, as compared with the case where the connecting part 23 (shown in FIG. 8) is disposed only in a partial region in the circumferential direction of the roller piece 7, the roller piece 7 in this embodiment can uniformly generate the a reaction force to the surface 2s (FIG. 6) of the tire member 2.

Figure 13:
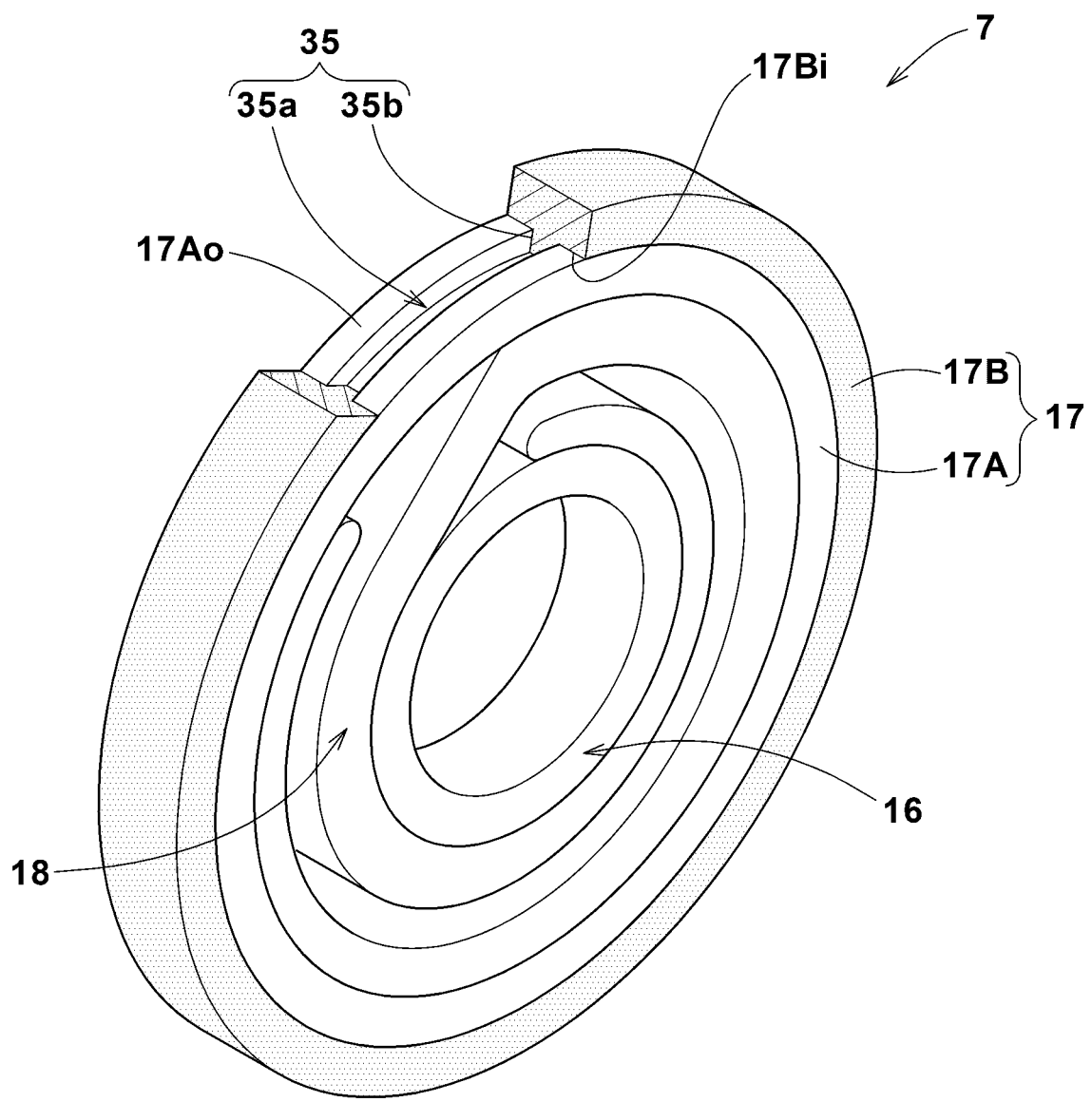
FIG. 13 A side view showing an example of the roller piece of yet another embodiment according to the present invention.

FIG. 13 is a perspective view showing an example of the roller piece 7 of still another embodiment according to the present invention.

Incidentally, descriptions of configurations in this embodiment which are the same as the former embodiment, may be omitted by giving the same reference numerals.

The outer ring portion 17 in this embodiment has a double layered structure composed of a first outer ring portion 17A, and a second outer ring portion 17B disposed on the outside in the roller's radial direction of the first outer ring portion 17A.

The elastic modulus of the second outer ring portion 17B is set to be lower than the elastic modulus of the first outer ring portion 17A.

In such outer ring portion 17, on the surface 2s (FIG. 6) side of the tire member 2, the second outer ring portion 17B can elastically deform in comparison with the first outer ring portion 17A.

Thereby, the roller piece 7 can prevent the reaction force to the surface 2s of the tire member 2 from becoming larger than necessary.

The material for forming the first outer ring portion 17A and the second outer ring portion 17B, may be appropriately selected.

The first outer ring portion 17A is made of the same material as the inner ring portion 16 and the connecting portion 18. In the first outer ring portion 17A in this embodiment, the inner ring portion 16 and the connecting portion 18 are integrally formed.

For example, when Nylon 6 is used for the first outer ring portion 17A, it is preferable that PTFE or NBR (nitrile rubber) whose elastic modulus is lower than Nylon 6 is used for the second outer ring portion 17B.

Incidentally, the first outer ring portion 17A and the second outer ring portion 17B are not limited to such materials.

This embodiment is provided with a holding means 35 for holding the first outer ring portion 17A and the second outer ring portion 17B.

The holding means 35 in this embodiment is composed of a recess 35a and a projection 35b.

The recess 35a in this embodiment dents toward the inside in the roller's radial direction from the outer peripheral surface 17Ao of the first outer ring portion 17A. The recess 35a is disposed in the center portion in the axial direction of the outer peripheral surface 17Ao of the first outer ring portion 17A.

The recess 35a in this embodiment extends continuously in the circumferential direction and is formed annularly in the outer peripheral surface 17Ao of the first outer ring portion 17A.

The projection 35b in this embodiment protrudes toward the inside in the roller's radial direction from the inner circumferential surface 17Bi of the second outer ring portion 17B.

The projection 35b is disposed in the center portion in the axial direction of the inner peripheral surface 17Bi of the second outer ring portion 17B.

Further, the convex portion 35b in this embodiment extends continuously in the circumferential direction and is formed annularly in the inner peripheral surface 17Bi of the second outer ring portion 17B.

Such holding means 35 can prevent axial displacements between the first outer ring portion 17A and the second outer ring portion 17B by fitting the convex portion 35b of the second outer ring portion 17B with the recess 35a of the first outer ring portion 17A.

Thereby, the roller pieces 7 in this embodiment can stably press the surface 2s of the tire member 2 (shown in FIG. 6) during rolling.

In order to exert such effects effectively, the width of the recess 35a and the projection 35b is preferably set to be 40% to 70% of the width of the first outer ring portion 17A and the second outer ring portion 17B.

In this embodiment, the recess 35a of the first outer ring portion 17A and the projection 35b of the second outer ring portion 17B are formed annularly. But, they are not limited to such embodiment.

Figure 14:
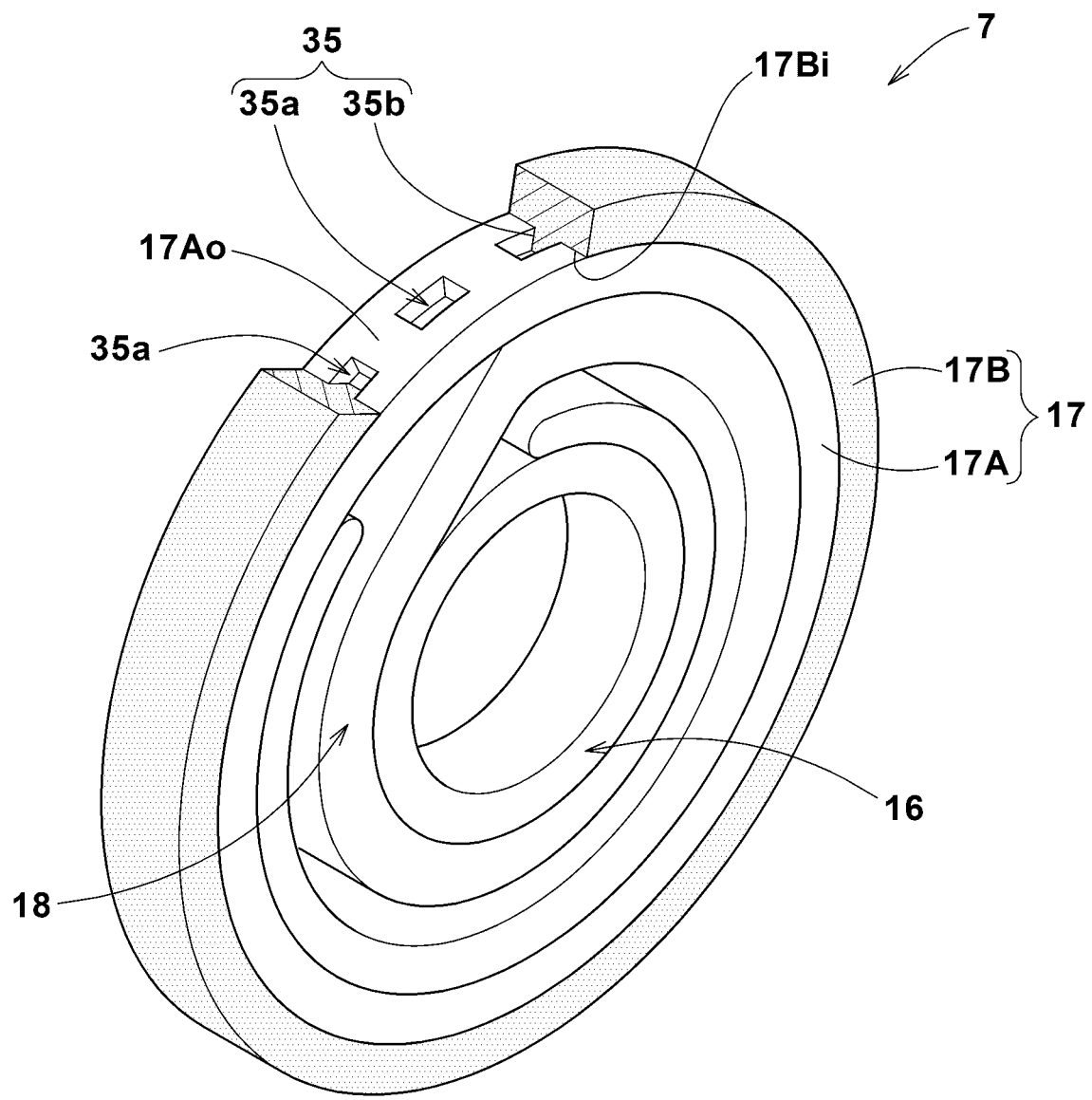
FIG. 14 A side view showing an example of the roller piece of yet another embodiment according to the present invention.

FIG. 14 is a perspective view showing an example of the roller piece 7 of yet another embodiment according to the present invention.

Incidentally, descriptions of configurations in this embodiment which are the same as the former embodiment, may be omitted by giving the same reference numerals.

The recess 35a of the first outer ring portion 17A in this embodiment is formed intermittently in the circumferential direction in the outer peripheral surface 17Ao of the first outer ring portion 17A.

Further, the projection 35b of the second outer ring portion 17B is formed intermittently in the circumferential direction in the inner circumferential surface 17Bi of the second outer ring portion 17B.

By fitting the recesses 35a into the convex portions 35b, the first outer ring portion 17A and the second outer ring portion 17B can be prevented from being displaced in the axial direction as well as in the circumferential direction.

In order to exert such effects effectively, it is preferred that the lengths in the circumferential direction of the recesses 35a and the projections 35b are set to be 2% to 10% of the circumferential length of the first outer ring portion 17A and the second outer ring portion 17B.

The outer ring portion 17 shown in FIG. 13 and FIG. 14 has the double layered structure comprising the first outer ring portion 17A and the second outer ring portion 17B. But, it may be of a three or more layered structure.

For example, when the outer ring portion 17 has a three-layered structure, it is preferable that the elastic modulus of the third outer ring (not shown), which is disposed on the outside in the roller's radial direction of the second outer ring portion 17B, is lower than the elastic modulus of the second outer ring portion 17B.

In the former embodiments, the pressure roller 1 for discharging the air between the rubber strips 4,4 (shown in FIG. 6) is illustrated. But, it is not limited to such embodiments.

For example, it may be configured as a wheel for conveying a moving body such as loading platform.

Figure 15:
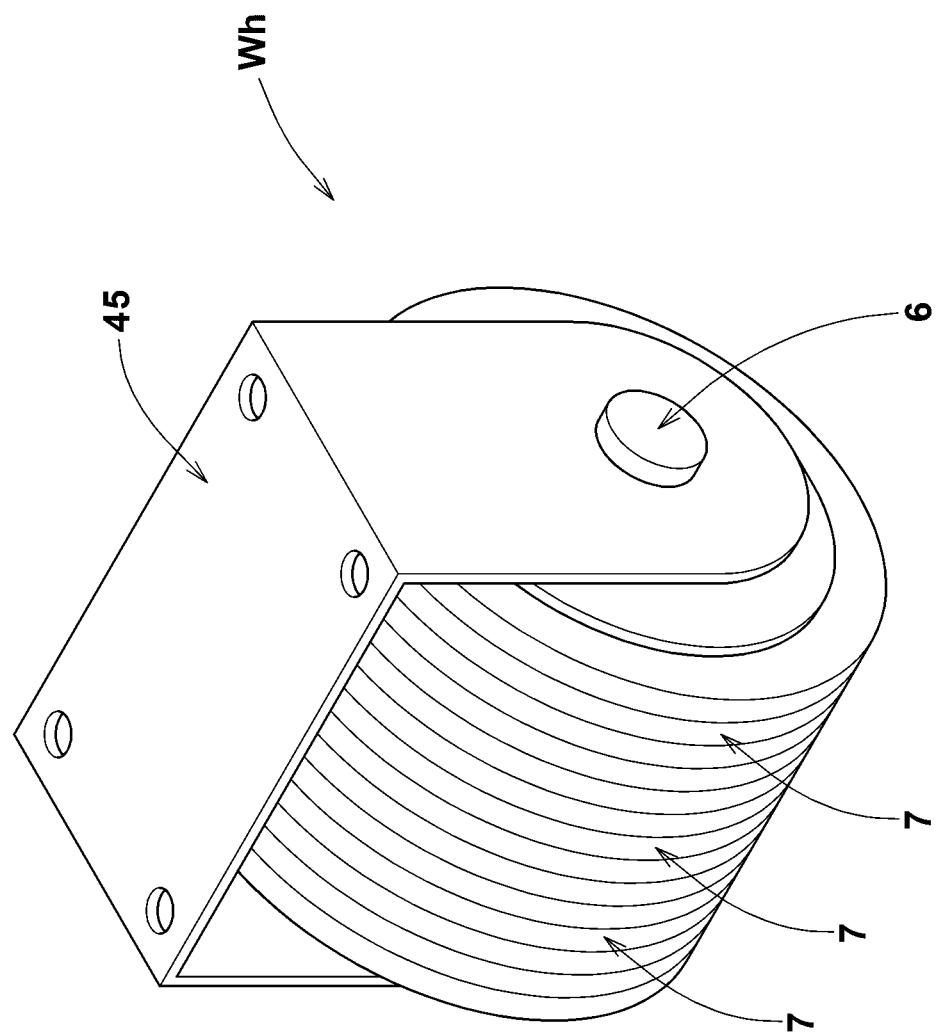
FIG. 15 A perspective view showing an example of a wheel.

FIG. 15 is a perspective view showing an example of the wheel Wh.

Incidentally, descriptions of configurations in this embodiment which are the same as the former embodiment, may be omitted by giving the same reference numerals.

In the wheel Wh in this embodiment, as with the former embodiments of the pressure roller 1 (FIG. 6), on the support shaft 6, a plurality of roller pieces 7 are arranged in the axial direction of the support shaft 6.

At the axial ends of the support shaft 6 in this embodiment, a bracket 45 for holding the support shaft 6 is provided. The bracket 45 is attached to the moving body (not shown) such as the loading platform for example.

Similarly to the pressure roller 1 shown in FIG. 6, such wheel Wh can roll while the roller pieces 7 are independently generating reaction forces against irregularities of a road surface (not shown).

Thereby, even if irregularities exist on a road surface (not shown), the wheel Wh can roll smoothly following the irregularities.

It is preferable that the roller pieces 7 constituting the wheel Wh each comprise, as shown in FIG. 13 and FIG. 14, the outer ring portion 17 comprising the first outer ring portion 17A and the second outer ring portion 17B having a lower elastic modulus than the elastic modulus of the first outer ring portion 17A.

Such outer ring portion 17 can impart cushioning properties to the roller piece 7.

Therefore, the wheel Wh can flexibly follow irregularities of a road surface (not shown) and it is possible to mitigate shocks caused by the irregularities.

While detailed description has been made of especially preferable embodiments of the present invention, the present invention can be embodied in various forms without being limited to the illustrated embodiments.

WORKING EXAMPLES

Working Example A

Pressure rollers having the basic structure shown in FIGS. 2-4 were manufactured (working examples 1-4).

In working examples 1-4, the respective roller pieces are supported by the support shaft through the mutually independent bearings.

The outer peripheral surfaces of the roller pieces of working example 1 were formed smoothly.

The outer peripheral surfaces of the roller pieces of working example 2 were provided with uneven portions having a ten-point average roughness (Rz) of 1.9 micrometers.

The outer peripheral surfaces of the roller pieces of working examples 3 and 4 were provided with uneven portions having a knurled portion (shown in FIG. 7 (a), (b)) with the groove width W5 of 1.2 mm and the depth D5 of 1.2 mm. The grooves of the knurled portion of working example 3 extend parallel to the axial direction of the roller pieces. The grooves of the knurled portion of working example 4 are inclined at an angle of 20 degrees with respect to the axial direction of the roller pieces.

For comparison, a pressure roller having a plurality of roller pieces fixed to a rotatable support shaft was manufactured (comparative example). Unlike the roller pieces of working examples 1-4, the roller pieces of comparative example can not rotate independently of each other.

Then, the pressure rollers of working examples 1-4 and the pressure roller of Comparative example were rotated for 2 weeks, and the number of broken roller pieces was recorded. Further, the pressure rollers of working examples 1-4 were visually checked for the presence or absence of adhesion of the tire member (i.e., presence or absence of the rubber adhered to the outer circumferential surface of the roller pieces). Common specifications are as follows.

Roller pieces' material: Nylon 6
Outer diameter of roller pieces: 45 mm
number of roller pieces: 7

In the test results, in the case of the pressure roller of Comparative example, two roller pieces were damaged, whereas in the case of the pressure rollers of working examples 1-4, the roller pieces were not broken.

Accordingly, as compared with the pressure roller of Comparative example, the pressure rollers of working examples 1-4 could prevent the breakage of the roller pieces for a long time, and the durability could be improved.

As compared with the pressure roller of working example 1, the pressure rollers of working examples 2-4 could prevent the tire member from sticking on the outer peripheral surface of the roller pieces.

Accordingly, as compared with the pressure roller of working example 1, the pressure rollers of working examples 2-4 could press the tire member effectively.

As the grooves of the knurled portion of the pressure roller of working example 4 were inclined, the biting into the surface of the tire member could be reduced as compared with the pressure roller of working example 3 having the grooves extending parallel to the axial direction of the roller pieces.

Working Example B

Pressure rollers having roller pieces having the basic structure shown in FIG. 2 and FIG. 3 and shown in Table 1 were manufactured (working examples 1 to 4).

For comparison, a conventional pressure roller having roller pieces with a connecting portion extending spirally in the circumferential direction (shown in FIG. 16) was prepared (comparative Example).

The dimensions of the roller pieces of working examples 1-4 were appropriately set as described in the specification. Other common specifications are as follows.

Roller pieces' material: Nylon 6
Outer diameter of roller pieces: 93 mm
Roller pieces' thickness: 5 mm
Maximum stroke of roller pieces: 10 mm Then, by rolling the pressure rollers of working examples 1-4 and comparative example on a pressure-sensitive paper disposed on the outer surface of the tire member, the reaction forces of the roller pieces were measured.

The evaluation were indicated by an index based on the reaction force of comparative example being 100. The greater the value is, the larger the reaction force of the roller pieces is, namely better.

The test results are shown in Table 1.

TABLE 1

Figure 16:
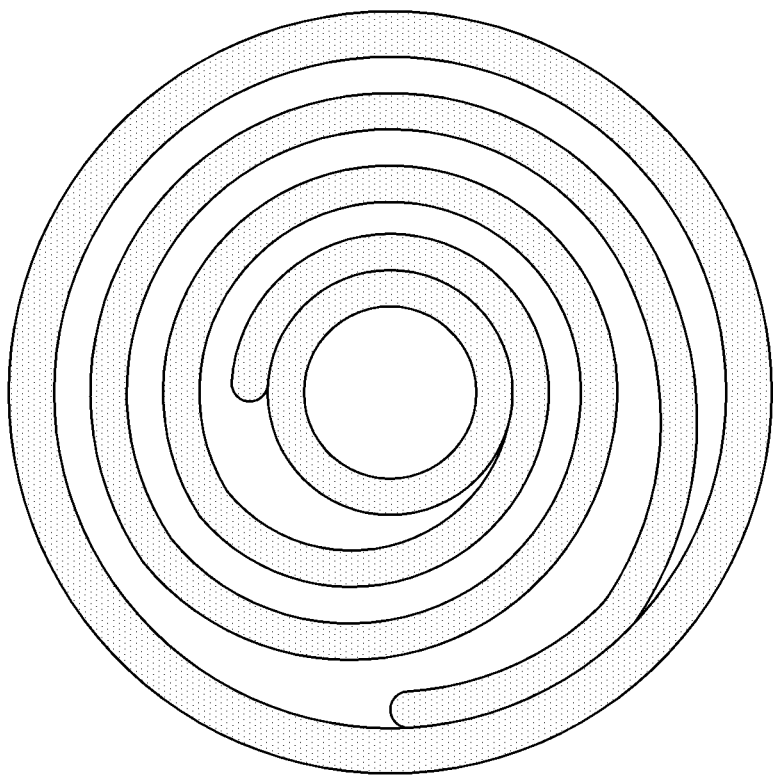
FIG. 16 A side view showing a roller of comparative example.

| | Comparative example | Working example 1 | Working example 2 | Working example 3 | Working example 4 |
|---|---|---|---|---|---|
| Figure showing Roller | FIG. 16 | FIG. 8 | FIG. 10 | FIG. 11 | FIG. 12 |
| Reaction force (index) [larger is better] | 100 | 110 | 120 | 140 | 105 |

In the test results, as compared with the pressure roller of comparative example, the pressure rollers of working examples 1-4 could increase the reaction forced of the roller pieces, without impairing the ability to follow the irregularities.

The invention claimed is:
1. A pressure roller for pressing a surface of a tire member made from an unvulcanized rubber member, and shaping the tire member, comprising:
a support shaft, and a plurality of elastically deformable roller pieces supported by the support shaft and arranged in the axial direction of the support shaft,
each roller piece having a pressing surface for contacting the surface of the tire member, and each roller piece is independently rotatably supported by the support shaft,
wherein:
each roller piece comprises:
an inner ring portion on a support shaft side;
an outer ring portion on a side in contact with the tire member; and
a single connecting portion connecting elastically between the inner ring portion and the outer ring portion,
the connecting portion comprises:
an inside part connected to the inner ring portion;
an outside part connected to the outer ring portion; and
a main part extending linearly from the inside part to the outside part while inclining with respect to the radial direction of the roller,
the inner ring portion, the outer ring portion, and the connecting portion are made of different materials different from each other, and
the inside part, the outside part and the main part are formed integrally from a same material.

2. The pressure roller for shaping the tire member as set forth in claim 1, wherein
each of the roller pieces is provided on an outer peripheral surface thereof with an uneven portion for preventing the tire member from adhering, and
the uneven portion includes a portion having a ten-point average roughness (Rz) of 1.3 to 2.5 micrometers.

3. The pressure roller for shaping the tire member as set forth in claim 2, wherein
the uneven portion includes a knurled portion, and
the knurled portion has grooves spaced in the circumferential direction of each roller piece, and each groove has a groove width of 0.5 to 2.0 mm and a depth of 0.5 to 2.0 mm.

4. The pressure roller for shaping the tire member as set forth in claim 1, wherein
the inside parts of the connecting portions of the roller pieces extend along outer peripheral surfaces of the respective inner ring portions to one side in the circumferential direction of the roller pieces, closely contacting the respective outer peripheral surfaces of the respective inner ring portions, and
the outside parts of the connecting portions of the roller pieces extend along inn peripheral surfaces of the respective outer ring portions to the other side in the circumferential direction of the roller pieces, closely contacting the respective inner peripheral surfaces of the respective outer ring portions,
wherein each of the outer ring portions and the inner ring portions is defined as having a constant radial dimension along its entire circumference.

5. The pressure roller for shaping the tire member as set forth in claim 4, wherein
in each of the roller pieces, the inside part of the single connecting portion overlaps in the circumferential direction with the outside part of the single connecting portion.

6. The pressure roller for shaping the tire member as set forth in claim 1, wherein
the outer ring portion has a structure comprising at least two layers of a first outer ring portion and a second outer ring portion disposed on the outside in the roller's radial direction of the first outer ring portion, and
the elastic modulus of the second outer ring portion is smaller than the elastic modulus of the first outer ring portion.

7. A pressure roller for pressing a surface of a tire member made from an unvulcanized rubber member and shaping the tire member, comprising:
a support shaft, and
a plurality of elastically deformable roller pieces each having a pressing surface for contacting the surface of the tire member, wherein the roller pieces are arranged in the axial direction of the support shaft and supported by the support shaft independently rotatably from each other, wherein
each of the roller pieces comprises:
an inner ring portion on a support shaft side,
an outer ring portion on a side in contact with the tire member, and
a spiral-shaped connecting portion extending spirally less than one turn and connecting elastically between the inner ring portion and the outer ring portion,
the connecting portion comprises:
an inside part connected to the inner ring portion;
an outside part connected to the outer ring portion; and
a main part extending spirally less than one turn from the inside part to the outside part,
the inner ring portion, the outer ring portion, and the connecting portion are made of different materials different from each other, and
the inside part, the outside part and the main part are formed integrally from a same material.

8. The pressure roller for shaping the tire member as set forth in claim 7, wherein
each of the roller pieces is provided on an outer peripheral surface thereof with an uneven portion for preventing the tire member from adhering, and
the uneven portion includes a portion having a ten-point average roughness (Rz) of from 1.3 to 2.5 micrometers.

9. The pressure roller for shaping the tire member as set forth in claim 8, wherein
the uneven portion includes a knurled portion comprising grooves each having a groove width of 0.5 to 2.0 mm and a depth of 0.5 to 2.0 mm, and the grooves are spaced in the circumferential direction of the roller piece and inclined with respect to the axial direction of the roller pieces.

10. The pressure roller for shaping the tire member as set forth in claim 7, wherein
the outer ring portion has a structure comprising at least two layers of a first outer ring portion and a second outer ring portion disposed on the outside in the roller's radial direction of the first outer ring portion, and
the elastic modulus of the second outer ring portion is smaller than the elastic modulus of the first outer ring portion.

11. The pressure roller for shaping the tire member as set forth in claim 7, wherein
each of the roller pieces has only one spiral-shaped connecting portion.

12. A pressure roller for pressing a surface of a tire member made from an unvulcanized rubber member and shaping the tire member, comprising:
a support shaft; and
a plurality of elastically deformable roller pieces each having a pressing surface for contacting the surface of the tire member, wherein the roller pieces are arranged in the axial direction of the support shaft and supported by the support shaft independently rotatably from each other, wherein:
each of the roller pieces comprises:
- an inner ring portion on a support shaft side;
- an outer ring portion on a side in contact with the tire member, and
- a plurality of connecting portions each connecting elastically between the inner ring portion and the outer ring portion, and each of the connecting portions comprises:
- an inside part connected to the inner ring portion;
- an outside part connected to the outer ring portion; and
- a main part extending linearly from the inside part to the outside part while inclining with respect to the radial direction of the roller, the inner ring portion, the outer ring portion, and the connecting portion are made of different materials different from each other, and the inside part, the outside part and the main part are formed integrally from a same material.

13. The pressure roller for shaping the tire member as set forth in claim 12, wherein
each of the roller pieces is provided on an outer peripheral surface thereof with an uneven portion for preventing the tire member from adhering, and
the uneven portion includes a portion having a ten-point average roughness (Rz) of 1.3 to 2.5 micrometers.

14. The pressure roller for shaping the tire member as set forth in claim 13, wherein
the uneven portion includes a knurled portion, and
the knurled portion has grooves spaced in the circumferential direction of the roller piece, and each groove has a groove width of 0.5 to 2.0 mm and a depth of 0.5 to 2.0 mm.

15. The pressure roller for shaping the tire member as set forth in claim 12, wherein
in each of the roller pieces, the inside part of each of the connecting portions overlaps in the circumferential direction with the outside part of a next one of the connecting portions.

16. The pressure roller for shaping the tire member as set forth in claim 15, wherein
the outer ring portion has a structure comprising at least two layers of a first outer ring portion and a second outer ring portion disposed on the outside in the roller's radial direction of the first outer ring portion, and
the elastic modulus of the second outer ring portion is smaller than the elastic modulus of the first outer ring portion.

17. The pressure roller for shaping the tire member as set forth in claim 15, wherein
the inside parts of the connecting portions of the roller pieces extend along outer peripheral surfaces of the respective inner ring portions to one side in the circumferential direction of the roller pieces, closely contacting the respective outer peripheral surfaces of the respective inner ring portions, and
the outside parts of the connecting portions of the roller pieces extend along inner peripheral surfaces of the respective outer ring portions to the other side in the circumferential direction of the roller pieces, closely contacting the respective inner peripheral surfaces of the respective outer ring portions,
wherein each of the outer ring portions and the inner ring portions is defined as having a constant radial dimension along its entire circumference.

18. The pressure roller for shaping the tire member as set forth in claim 17, wherein
in each of the roller pieces, a number of the connecting portions is two, and the two connecting portions are arranged around the support shalt so that the main parts of the two connecting portions are arranged at intervals of substantially 180 degrees.

19. The pressure roller for shaping the tire member as set forth in claim 17, wherein
in each of the roller pieces, a number of the connecting portions is four, and the four connecting portions are arranged around the support shaft so that the main parts of the four connecting portions are arranged at intervals of substantially 90 degrees.

* * * * *